(12) United States Patent
Matsui et al.

(10) Patent No.: US 7,783,115 B2
(45) Date of Patent: Aug. 24, 2010

(54) APPARATUS AND METHOD FOR SETTING DEGREES OF IMPORTANCE, APPARATUS AND METHOD FOR REPRESENTATIVE IMAGE SELECTION, APPARATUS AND METHOD FOR PRINTING-RECOMMENDED IMAGE SELECTION, AND PROGRAMS THEREFOR

(75) Inventors: Yuko Matsui, Asaka (JP); Shunichiro Nonaka, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1289 days.

(21) Appl. No.: 11/298,742

(22) Filed: Dec. 12, 2005

(65) Prior Publication Data
US 2006/0139461 A1 Jun. 29, 2006

(30) Foreign Application Priority Data

| Dec. 14, 2004 | (JP) | 2004-360870 |
|---|---|---|
| Dec. 15, 2004 | (JP) | 2004-363035 |
| Feb. 18, 2005 | (JP) | 2005-042093 |

(51) Int. Cl.
*G06K 9/68* (2006.01)

(52) U.S. Cl. .................. 382/227; 382/224

(58) Field of Classification Search .................. 382/224, 382/228
See application file for complete search history.

(56) References Cited

U.S. PATENT DOCUMENTS

| 5,818,439 | A | 10/1998 | Nagasaka et al. |
|---|---|---|---|
| 6,606,411 | B1 | 8/2003 | Loui et al. |
| 6,865,297 | B2 | 3/2005 | Loui et al. |
| 6,907,141 | B1 | 6/2005 | Okamoto |
| 2003/0030669 | A1 | 2/2003 | Ono |
| 2003/0169288 | A1 | 9/2003 | Misawa |
| 2003/0198390 | A1 | 10/2003 | Loui et al. |
| 2004/0172440 | A1* | 9/2004 | Nakajima et al. ........... 709/200 |
| 2004/0208365 | A1 | 10/2004 | Loui et al. |
| 2004/0258304 | A1 | 12/2004 | Shiota et al. |

FOREIGN PATENT DOCUMENTS

| JP | 5-128166 | 5/1993 |
|---|---|---|
| JP | 8-292965 | 11/1996 |
| JP | 10-162020 | 6/1998 |
| JP | 2000-184318 | 6/2000 |
| JP | 2000-244849 | 9/2000 |
| JP | 2001-256498 | 9/2001 |
| JP | 2002-10179 | 1/2002 |
| JP | 2002-218388 | 8/2002 |
| JP | 2002-229985 | 8/2002 |
| JP | 2003-44511 | 2/2003 |
| JP | 2003-67722 | 3/2003 |

(Continued)

*Primary Examiner*—Brian Q Le
*Assistant Examiner*—Edward Park
(74) *Attorney, Agent, or Firm*—McGinn IP Law Group, PLLC

(57) ABSTRACT

A plurality of images are classified into hierarchical categories. A degree of importance for each of the categories is set according to at least one of: the number of images therein, the number of images in an upper-level category, the number of categories related to the category, the number of hierarchical levels below the category, and the number of hierarchical levels from the uppermost level to the level of the category.

8 Claims, 31 Drawing Sheets

FOREIGN PATENT DOCUMENTS

| | | |
|---|---|---|
| JP | 2003-108973 | 4/2003 |
| JP | 2003-281540 | 10/2003 |
| JP | 2003-296165 | 10/2003 |
| JP | 2003-348528 | 12/2003 |
| JP | 2004-213428 | 7/2004 |
| JP | 2004-236120 | 8/2004 |
| JP | 2004-310436 | 11/2004 |

* cited by examiner

APPARATUS AND METHOD FOR SETTING DEGREES OF IMPORTANCE, APPARATUS AND METHOD FOR REPRESENTATIVE IMAGE SELECTION, APPARATUS AND METHOD FOR PRINTING-RECOMMENDED IMAGE SELECTION, AND PROGRAMS THEREFOR

BACKGROUND OF THE INVENTION

1. Field of the Invention

The present invention relates to an apparatus and a method for setting degrees of importance to respective categories obtained by hierarchical classification of a plurality of images and to a program for causing a computer to execute the importance degree setting method.

The present invention also relates to an apparatus and a method for selecting a representative image from a plurality of images, and to a program for causing a computer to execute the representative image selection method.

In addition, the present invention relates to an apparatus and a method for selecting an image whose printing is recommended from a plurality of images, and to a program for causing a computer to execute the printing-recommended image selection method.

2. Description of the Related Art

Following the spread of digital cameras and scanners, anyone can obtain digital images with ease. Images are input to personal computers for classification thereof, and the images are often classified into events related to a user. For example, in the case of a trip to Europe, images are firstly classified into categories of countries such as France, UK, and Spain, and images classified into the category of France are further classified into detailed categories of places such as Paris and Nice. Images classified into the category of Paris are then classified into more detailed categories such as the Eiffel Tower, the Arch of Triumph, and the Notre Dame Cathedral. Images of Notre Dame Cathedral may further be classified into much more detailed categories such as "In Front Of The Cathedral", "Outside The Cathedral", and "Inside The Cathedral".

If images are hierarchically classified into a plurality of categories, the images can be referred to later according to events and can be organized with ease.

On the other hand, a user needs to carry out hierarchical classification of the images while viewing the images and refreshing his/her memory, which is a troublesome operation for the user.

For this reason, various methods have been proposed for automatically classifying images. For example, in a method proposed in Japanese Unexamined Patent Publication No. 2000-112997, images are classified into categories based on information on time and date of photography added to the images. In this method, the images are arranged along a time axis based on the information, and the images are classified according to a difference in the time and date of photography between two of the images neighboring each other in the time axis. In another method proposed in Japanese Unexamined Patent Publication No. 2003-108973, images are classified into categories according to the schedule of a user, with reference to schedule information of the user. Furthermore, in a method proposed in U.S. Pat. No. 6,907,141, characteristic quantities are calculated from a plurality of images, and the images are classified into categories based on the relationship between the characteristic quantities of the images.

By using such a method at the time of organizing images, a user does not need to classify images by himself/herself, which reduces the burden on him/her.

Furthermore, if representative images are displayed at the time of organizing images for representing image groups classified into respective categories, what types of images are classified into the respective categories can be easily understood at a glance. For this reason, a method has been proposed for displaying representative images for respective categories at the time of image search (see Japanese Unexamined Patent Publication No. 5(1993)-128166). In addition, a method of displaying representative images in folders corresponding to respective categories has also been proposed (Japanese Unexamined Patent Publication No. 2003-296165).

In the methods described in Japanese Unexamined Patent Publications Nos. 5(1993)-128166 and 2003-296165, representative images are selected by a user. However, methods for automatically selecting representative images have also been proposed. For example, in a method proposed in Japanese Unexamined Patent Publication No. 2000-244849, an image having the largest number of pixels is selected as a representative image. Furthermore, in a method proposed in U.S. Patent Application Publication No. 20030169288, reproduction time of each image is recorded, and an image having a long reproduction time is selected as a representative image.

Meanwhile, a user can store a large number of images in a recording medium, thanks to the spread of digital cameras and a soaring increase in capacity of recording media. On the other hand, an operation is necessary for selecting an image to be subjected to processing such as printing from a large amount of images. Therefore, in order to efficiently select an image, a function is desired for screening images according to a condition before a user determines an image to print, or for selecting an image to print according to the preference of a user.

In Japanese Unexamined Patent Publication No. 2002-010179, a method of automatic elimination of an inappropriate image for printing has been proposed based on image lightness, or an acceleration sensor, or an AF evaluation.

Furthermore, in Japanese Unexamined Patent Publication No. 2001-256498, a method has been proposed for classifying images into images suitable for printing and images not suitable for printing at the time of reception of a printing order regarding the images, by analyzing whether each of the images is well focused and whether each of the images has appropriate lightness.

However, in the case where images have been classified automatically as has been described above, a user does not know which of categories has important images for the user unless the user confirms the images classified into the categories.

Furthermore, in the case where photography is carried out by use of a digital camera, the number of pixels is not changed frequently. Consequently, the number of pixels in images obtained by a digital camera often remains constant. In a situation like this, the method described in Japanese Unexamined Patent Publication No. 2000-244849 cannot select a representative image.

Moreover, in the method described in U.S. Patent Application Publication No. 20030169288 for selecting an image having a long reproduction time as a representative image, a user inputs images from a digital camera to a personal computer, and an image, which is frequently reproduced on the personal computer, is selected as a representative image. However, the representative image cannot be selected immediately after the images are input from the digital camera to the personal computer (that is, in a state where none of the images have been reproduced).

The methods described in Japanese Unexamined Patent Publications No. 2002-010179 and 2001-256498 are image selection techniques that pay attention only to image quality and a photography condition. However, an image to print is difficult to select in the same manner as a general user selects an image to print, only by paying attention to image quality and a photography condition. For this reason, automatic image selection according to an intention of a user has not necessarily been realized.

SUMMARY OF THE INVENTION

The present invention has been conceived based on consideration of the above circumstances. An object of the present invention is therefore to enable understanding of which hierarchical category has important images, without a burden on a user.

Another object of the present invention is to enable secure selection of a representative image that is important for a user, especially from images classified into categories.

Still another object of the present invention is to enable selection of an image to print, in the same manner as a user selects an image to print.

In the case where images are classified into a plurality of categories, people often think that the larger the number of images is in a category, the more important the category is. Furthermore, in categories of hierarchical structure, a category is often thought to be more important if the number of images becomes larger in a category above the category. In addition, a category is often thought to be more important if the number of categories becomes larger at the same hierarchical level sharing the same upper-level category immediately above the category. A category is also thought to be more important as the number of hierarchical levels below the category becomes larger. Furthermore, people often think that a category is more important as the number of hierarchical levels from the uppermost level to the level of the category becomes larger. An importance degree setting apparatus of the present invention pays attention to these facts.

More specifically, an importance degree setting apparatus of the present invention comprises setting means for setting a degree of importance for each of categories (hereinafter referred to as the category) generated through hierarchical classification of images, based on at least one of: the number of images included in the category, the number of images included in an upper-level category, the number of categories related to the category, the number of hierarchical levels below the category, and the number of hierarchical levels from the uppermost level to the category.

"The categories related to the category" refer to a part of the hierarchical categories included at the same hierarchical level as the category and having the same upper-level category immediately above the category. Therefore, the number of categories related to the category refers to the number of categories included at the same hierarchical level as the category and having the same upper-level category as the category.

In the importance degree setting apparatus of the present invention, the setting means may set the degree of importance for the category by weighted addition of the number of images included therein and the number of images included in the upper-level category. Weighting coefficients for the weighted addition may all be 1.

In the importance degree setting apparatus of the present invention, the setting means may set the degree of importance for the category by weighted addition of the number of images included in the category, the number of categories related to the category, and the number of hierarchical levels below the category. Weighting coefficients for the weighted addition may all be 1.

Furthermore, the setting means in the importance degree setting apparatus of the present invention may set the degree of importance for the category by multiplying the number of images included in the category, the number of categories related to the category, and the number of hierarchical levels from the uppermost level to the level of the category.

Moreover, in the case where the category has lower-level categories, the setting means in the importance degree setting apparatus of the present invention may set the degree of importance for the category as the degree of importance that is the largest among the degrees of importance for the categories immediately below the category.

The importance degree setting apparatus of the present invention may also have display control means for displaying a hierarchical structure of the categories in such a manner that the degrees of importance set for the respective categories are visually perceptible.

In order to display the degrees of importance on display means, a folder may be used for each of the hierarchical categories for storing images classified into the category therein. When the hierarchical structure of the categories (that is, a folder structure) is displayed by viewer software or the like, the folders may be displayed in colors corresponding to the degrees of importance for the respective categories, for example. Alternatively, the categories may be ranked according to the degrees, and values representing the ranks may be given to the corresponding folders to be displayed.

The importance degree setting apparatus of the present invention may further comprise:

representative image selection means for selecting at least one representative image that represents a part of the categories whose degree or degrees of importance is/are high; and representative image display means for displaying the representative image or images.

The part of the categories whose degree or degrees of importance is/are high refers not only to the category whose degree of importance is the highest but also to a predetermined number (such as 3 or 5) of the categories ranked highly when the categories are sorted in descending order of the degrees of importance.

An importance degree setting method of the present invention comprises the step of setting a degree of importance for each of categories generated through hierarchical classification of images, based on at least one of: the number of images included in the category, the number of images included in an upper-level category, the number of categories related to the category, the number of hierarchical levels below the category, and the number of hierarchical levels from the uppermost level to the level of the category.

The importance degree setting method of the present invention may be provided as a program for causing a computer to execute the method.

According to the importance degree setting apparatus and the importance degree setting method of the present invention, the degree of importance for each of the categories can be set according to at least one of: the number of images included in the category, the number of images included in an upper-level category, the number of categories related to the category, the number of hierarchical levels below the category, and the number of hierarchical levels from the top level to the category. Therefore, without a burden on a user, which of the categories has important images can be understood.

In addition, by displaying the degrees of importance for the respective categories, the user can understand the degrees for the categories by glancing at the result of display.

Furthermore, by selecting the representative image or images from the category or categories whose degree or degrees is/are high and by displaying the representative image or images, the user can easily understand which image or images is/are the representative image or images. Since the representative image or images is/are selected from the category or categories whose degree or degrees is/are high, the representative image or images is/are often important for the user. Therefore, by displaying the representative image or images, the user can be induced to use the representative image or images for placing a print order or the like.

A first representative image selection apparatus of the present invention is a representative image selection apparatus for selecting a predetermined number of representative images from a plurality of images, and the apparatus comprises:

candidate selection means for selecting candidate images for the representative images from a part of categories whose degree or degrees of importance is/are high, among the categories obtained by hierarchical classification of the images and respectively given the degrees of importance; and selection means for selecting the predetermined number of representative images from the candidate images.

The part of categories whose degree or degrees of importance is/are high refers not only to the category whose degree of importance is the highest but also to a predetermined number of the categories ranked highly when the categories are sorted in descending order of the degrees.

In the first representative image selection apparatus of the present invention, the selection means may calculate a representative quantity of changes in pixel values corresponding to each other between a processed image obtained by carrying out image processing for image quality enhancement on each of the selected candidate images and a non-processed image as the candidate image before the image processing. In this case, the selection means selects the predetermined number of the candidate images in ascending order of the representative quantity starting from the smallest representative quantity, as the representative images.

The image processing refers to any processing as long as the processing can enhance image quality. For example, the image processing refers to at least one of: gradation correction processing, color correction processing, lightness correction processing, white balance correction processing, saturation correction processing, sharpness processing, noise reduction processing, red-eye correction processing, and skin enhancement processing.

The representative quantity refers to any quantity as long as the quantity can represent the changes in the pixel values in a part of the image or in the entire image. For example, the representative quantity may be a mean or median of the changes in the pixel values. In the case where the image comprises RGB colors, the pixel values refer to values of luminance calculated from the colors, or pixel values of the colors themselves. In this case, changes in the pixel values refer to absolute values of differences in the luminance values between the processed image and the non-processed image, or distances (that is, square roots of squares of differences) between the pixel values in the processed image and the non-processed image in a three-dimensional RGB color space, for example.

A second representative image selection apparatus of the present invention is a representative image selection apparatus for selecting a predetermined number of representative images from a plurality of images, and the apparatus comprises:

change calculation means for calculating a representative quantity of changes in pixel values corresponding to each other between a processed image obtained by carrying out image processing for image quality enhancement on each of the images and a non-processed image as the image before the image processing; and selection means for selecting the predetermined number of the images in ascending order of the representative quantity starting from the smallest representative quantity, as the representative images.

In the first and second representative image selection apparatuses of the present invention, the representative quantity may be a value obtained by normalization of the mean of the changes between the pixel values.

The representative quantity may be a value obtained by correction of the value obtained by normalization of the mean of the changes in the pixel values, according to at least one of: reproduction time of the image and time and date of last reproduction of the image.

Correction according to the reproduction time refers to causing the representative quantity to become smaller by subtraction of a value corresponding to the reproduction time from the value obtained by normalization of the mean of the changes in the pixel values, as the reproduction time becomes longer. Correction according to the time and date of last reproduction refers to causing the representative quantity to become larger by addition of a larger value to the value obtained by normalization of the mean of the changes in the pixel values, as the time from the last reproduction becomes longer.

A first representative image selection method of the present invention is a representative image selection method for selecting a predetermined number of representative images from a plurality of images, and the method comprises the steps of:

selecting candidate images for the representative images from a part of categories whose degree or degrees of importance is/are high, among the categories obtained by hierarchical classification of the plurality of images and respectively given the degrees; and selecting the predetermined number of representative images from the candidate images.

A second representative image selection method of the present invention is a representative image selection method for selecting a predetermined number of representative images from a plurality of images, and the method comprises the steps of:

calculating a representative quantity of changes in pixel values corresponding to each other between a processed image obtained by carrying out image processing for image quality enhancement on each of the images and a non-processed image as the image before the image processing; and selecting the predetermined number of the images in ascending order of the representative quantity starting from the smallest representative quantity, as the representative images.

The first and second representative image selection methods of the present invention may be provided as programs for causing a computer to execute the methods.

According to the representative image selection apparatuses and the representative image selection methods of the present invention, the candidate images for the representative images are selected from the part of the categories whose degree or degrees of importance is/are high among the categories respectively given the degrees. The predetermined number of representative images are then selected from the candidate images. Since the candidate images are selected from the category or categories of the high degree or degrees, the images are often important for a user. Therefore, the representative images that are important for the user can be selected with certainty.

Furthermore, the candidate images are selected from the category or categories of the high degree or degrees, and the representative images are selected from the candidate images. Therefore, time necessary for selecting the representative images can be shorter than in the case of selecting the representative images from the entire images.

If the representative quantity is small in the changes in the pixel values corresponding to each other between the processed image obtained by carrying out the image processing for quality enhancement and the non-processed image before the image processing, a change between the processed image and the non-processed image is small. In other words, the image needs less image processing, meaning that the image has been photographed well and has high quality.

For this reason, the representative quantity of the changes in the pixel values is calculated for each of the selected candidate images, and the predetermined number of the images in ascending order of the representative quantity are selected as the representative images. In this manner, the images of high quality can be selected as the representative images.

Furthermore, by letting the representative quantity be the value obtained by normalization of the mean of the changes in the pixel values, a maximum value and a minimum value of the representative quantity can be understood clearly. Therefore, the representative quantity can be easy to understand.

The representative images can also be selected to reflect preference of the user, by correcting the normalized value according to at least one of: the image reproduction time and the time and date of last reproduction.

In the case where a user selects an image to print from a plurality of images, the user unconsciously classifies the images into categories, and judges image quality, subject, and a photography condition of the images in each of the categories for decision of the image to print. A printing-recommended image selection apparatus of the present invention pays attention to this fact.

More specifically, a printing-recommended image selection apparatus of the present invention is an apparatus for selecting an image whose printing is recommended from a plurality of images, and the apparatus comprises:

classification means for classifying the images into categories;

analysis means for analyzing the images;

suitability calculation means for calculating suitability for printing, based on the result of the classification by the classification means and the result of the analysis by the analysis means; and selection means for selecting the printing-recommended image from the images, according to the printing suitability.

The classification means may classify the images into the categories by hierarchical classification of the images according to events, or by classifying similar images into the same category, or by carrying out scene analysis on the images for classifying similar scenes into the same category, for example.

As analysis items carried out by the analysis means may be listed image quality (whether lightness satisfies a predetermined condition, whether a blur is observed, and whether a skin color is appropriate, for example), presence or absence of face, face recognition (who is in the image), facial expression (whether the person is smiling), and whether eyes are closed, for example. The analysis means carries out the analysis on a necessary part of the items based on the images and on information added to the images.

The printing suitability refers to a value found from the result of classification by the classification means and the result of the analysis by the analysis means.

The printing-recommended image selection apparatus of the present invention may further comprise parameter calculation means for calculating a parameter representing preference of a user. In this case, the selection means selects the printing-recommended image based on the parameter and the printing suitability.

The parameter refers to a value calculated from importance of the items of the analysis by the analysis means according to the preference of the user. More specifically, the parameter is a value used for weighting the analysis result obtained by the analysis means, regarding the analysis items.

The printing-recommended image selection apparatus of the present invention may further comprise:

detection means for detecting input of the images; and control means for controlling the classification means, the analysis means, the suitability calculation means, and the selection means to carry out the classification, the analysis, the calculation of the printing suitability, and the selection when the detection means detects the input of the images.

A digital camera of the present invention comprises the printing-recommended image selection apparatus of the present invention.

A printer of the present invention comprises the printing-recommended image selection apparatus of the present invention.

A print order apparatus of the present invention comprises the printing-recommended image selection apparatus of the present invention.

A printing-recommended image selection method of the present invention is a method for selecting an image whose printing is recommended from a plurality of images, and the method comprises the steps of:

classifying the images into categories;

analyzing the images;

calculating suitability for printing, based on the result of the classification and the result of the analysis; and selecting the printing-recommended image from the images, according to the printing suitability.

The printing-recommended image selection method of the present invention may be provided as a program for causing a computer to execute the method.

According to the printing-recommended image selection apparatus and the printing-recommended image selection method of the present invention, the images are classified into the categories, and the printing suitability is calculated based on the result of the classification and the result of the analysis. The printing-recommended image is then selected according to the printing suitability. Therefore, the image can be selected in the same manner as the user actually selects the image to print.

Moreover, by selecting the printing-recommended image based on the parameter representing preference of the user in addition to the suitability, image selection reflecting the preference of the user can also be realized.

DESCRIPTION OF THE PREFERRED EMBODIMENTS

Figure 1:
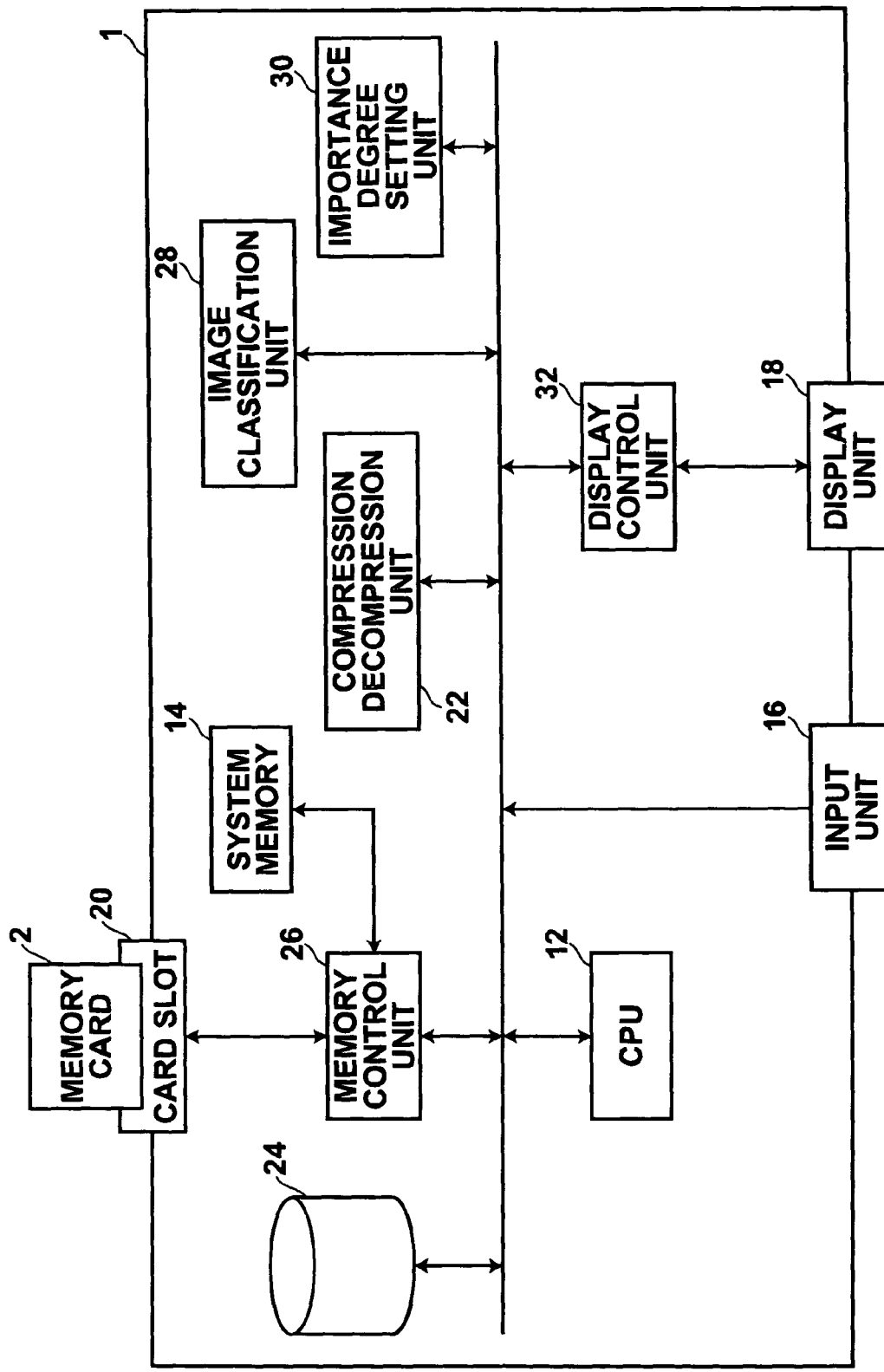
FIG. 1 is a block diagram showing the configuration of an importance degree setting apparatus according to a first embodiment of the present invention.

Hereinafter, embodiments of the present invention will be described with reference to the accompanying drawings. FIG. 1 is a block diagram showing the configuration of an importance degree setting apparatus according to a first embodiment of the present invention. As shown in FIG. 1, an importance degree setting apparatus 1 in the first embodiment comprises a CPU 12, a system memory 14, an input unit 16, and a display unit 18. The CPU 12 carries out various kinds of control such as image data recording control, display control, and control of each unit comprising the apparatus 1. The system memory 14 comprises a ROM for storing a program for operating the CPU 12, viewer software for image viewing, and various constants. The CPU 12 also comprises a RAM used as a workspace for the CPU 12. The input unit 16 comprises a keyboard and a mouse for inputting various kinds of instructions to the apparatus 1. The display unit 18 comprises a liquid crystal display monitor and the like used for various kinds of display.

The importance degree setting apparatus 1 also comprises a card slot 20 for reading image data from a memory card 2 and for recording image data in a memory card 2, a compression decompression unit 22 for compressing image data according to a method using JPEG, motion JPEG, and the like and for decompressing compressed image data, a hard disc 24 for storing the image data and various kinds of programs executed by the CPU 12, and a memory control unit 26 for controlling the system memory 14, the card slot 20, and the hard disc 24.

The importance degree setting apparatus 1 also has an image classification unit 28 for carrying out hierarchical classification of images stored in a folder desired by a user in the hard disc 24 into categories, and an importance degree setting unit 30 for setting a degree of importance for each of the categories. The importance degree setting apparatus 1 also has a display control unit 32 for controlling display by the display unit 18.

Figures 2, 3:
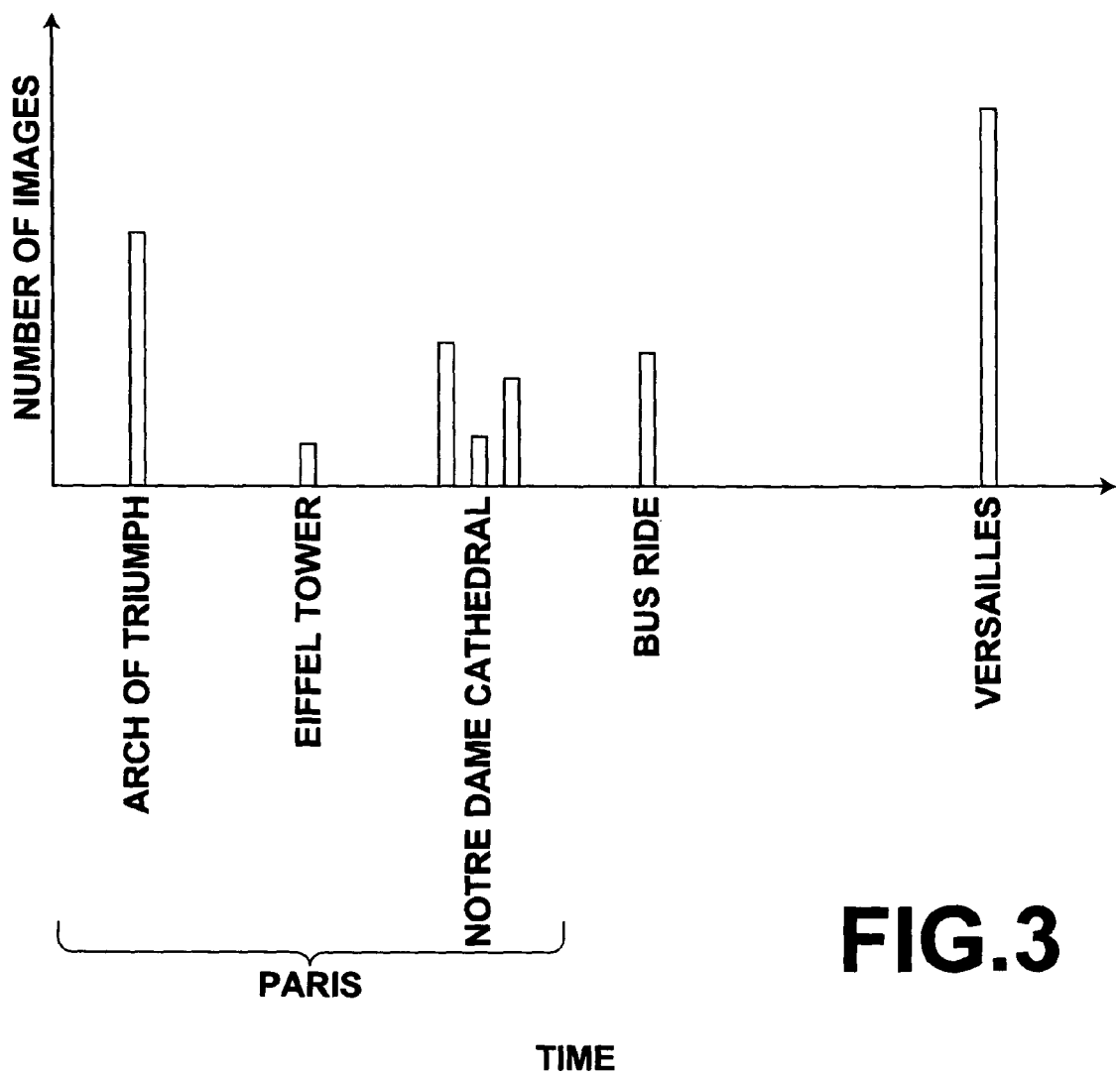
FIG. 2 shows a timetable of a day during a trip to France by a user.
FIG. 3 shows a relationship between time and the number of images in the trip to France.

The image classification unit 28 carries out the hierarchical classification of the images in the hard disc 24 into the categories, according to the method described in Japanese Unexamined Patent Publication No. 2000-112997, for example. Hereinafter, this image classification will be described. The case will be described below where images photographed by a user during a trip to France are classified. FIG. 2 is a timetable showing a day during the trip. As shown in FIG. 2, the user visited Paris during the trip, and then moved to Versailles by bus. In Paris, the user visited the Arch of Triumph, the Eiffel Tower, and the Notre Dame Cathedral. The user visited Bourgogne on the following day.

In the case where the user made another trip after the trip to France, an interval between the trip and the trip to France is one day or more. Furthermore, in the case where the user visited Paris and Versailles on one day and visited Bourgogne on the next day, an interval between the visit to Paris and Versailles and the visit to Bourgogne is one hour or more. In the case of travel by bus, intervals between the visit to Paris, a bus ride, and the visit to Versailles are 30 minutes or more but less than one hour. Intervals between the visits to the Arch of Triumph, the Eiffel Tower, and the Notre Dame Cathedral are 10 minutes or more but less than 30 minutes, since all of these places are in Paris. In the Notre Dame Cathedral, the user moved within the premises of the Cathedral, such as in front of the Cathedral, a place outside the Cathedral, and inside the Cathedral. Therefore, intervals between these movements are 3 minutes or longer but less than 10 minutes, since the user was moving within the same premises.

Consequently, in the case where the user photographed collectively during each of the visits, the number of images is related to the time as shown in FIG. 3, assuming that two images photographed at an interval of less than 3 minutes are regarded as images taken at the same time. In other words, as shown by the relationship between the number of images and the time in FIG. 3, groups of images were obtained at the respective visits occurring in some intervals.

The image classification unit 28 classifies the images into the hierarchical categories by using this relationship. More specifically, the image classification unit 28 classifies a group of images separated from other image groups by photography intervals of one day or longer into a category, while referring to the relationship shown in FIG. 3. In this case, the image classification unit 28 classifies all the images obtained in the trip to France into one category. The image classification unit 28 then classifies groups of images whose photography intervals are one hour or longer in the classified category into separate categories. In this case, an image group obtained in Paris and Versailles and an image group obtained during the visit to Bourgogne are classified into respective categories.

The image classification unit 28 thereafter classifies image groups whose photography intervals are 30 minutes or longer but shorter than one hour into respective categories. In this case, in the categories of visit to Paris and Versailles, image groups obtained during the visit to Paris, during the bus ride, and during the visit to Versailles are classified into respective categories. The image classification unit 28 further classifies image groups whose photography intervals are 10 minutes or longer but shorter than 30 minutes into respective categories. In this case, in the category of visit to Paris, the image classification unit 28 classifies the image groups obtained during the visit to the Arch of Triumph, the visit to the Eiffel Tower, and the visit to the Notre Dame Cathedral into respective categories. In addition, the image classification unit 28 classifies image groups whose photography intervals are 3 minutes or longer but shorter than 10 minutes into respective categories. In this case, the image classification unit 28 classifies, for the category of the visit to the Notre Dame Cathedral, image groups obtained in front of the Cathedral, outside the Cathedral, and inside the Cathedral into respective categories.

The image classification unit 28 generates a folder for each of the categories, and stores the images classified into the respective categories in the folders corresponding thereto, in order to end the image classification.

Figure 4:
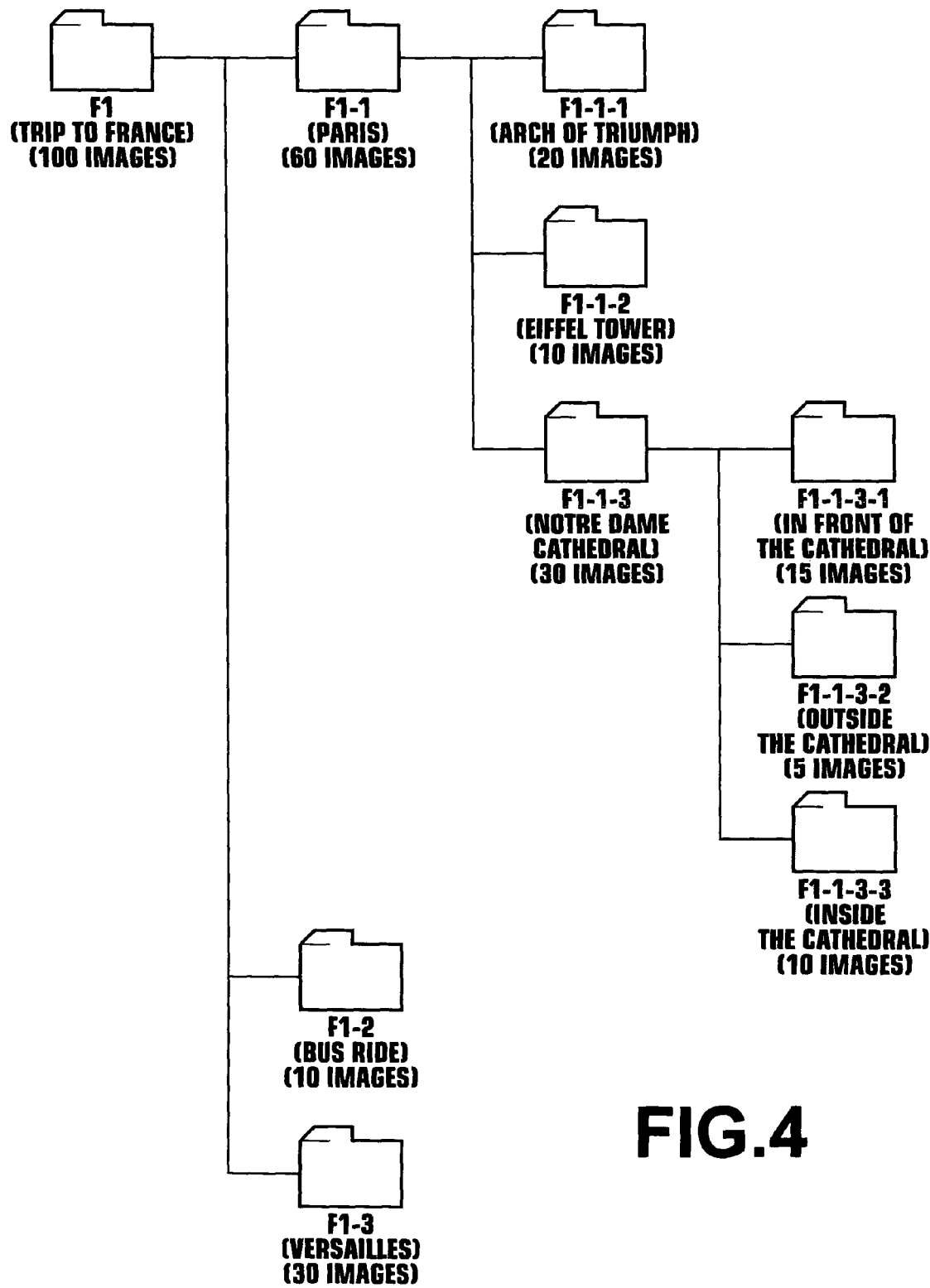
FIG. 4 shows a folder structure after classification.

FIG. 4 shows a folder structure after the image classification. The folder structure for the images on the first day during the trip to France will be described below. As shown in FIG. 4, a folder F1 (a folder "Trip To France") corresponding to the category of the trip is located at the uppermost level of the structure, and folders F1-1, F1-2, and F1-3 corresponding to the categories "Paris", "Bus Ride", and "Versailles" are located below the folder F1 for storing the images classified into the respective categories.

Under the folder of Paris are located folders F1-1-1, F1-1-2, and F1-1-3 corresponding to the categories "The Arch of Triumph", "The Eiffel Tower", and "The Notre Dame Cathedral" for respectively storing the images classified into the categories.

Furthermore, folders F1-1-3-1, F1-1-3-2, and F1-1-3-3 are located below the folder of the Notre Dame Cathedral, corresponding to the categories "In Front Of The Cathedral", "Outside the Cathedral", and "Inside The Cathedral" for respectively storing the images classified therein.

Each of the folders has the name for easy understanding of this description. However, no names are given to the folders in reality, and only numbers corresponding to the hierarchical levels are given to the folders as shown in FIG. 4. Therefore, the user does not know which of the images has been classified into which of the folders unless he/she opens the folders.

Using the result of the classification by the image classification unit 28, the importance degree setting unit 30 sets the degree of importance for each of the categories. More specifically, the importance degree setting unit 30 sets the degree according to at least one of: the number of images in each of the categories, the number of images included in an upper-level categories, the number of categories related to the category, the number of hierarchical levels under the category, and the number of the hierarchical levels from the top level to the level of the category. Hereinafter, how the degrees of importance are set will be described.

As shown in FIG. 4, 100 images have been obtained in the trip to France, and 60 of the images have been classified into the category of Paris, while 10 of the images have been classified into the category of bus ride. The remaining 30 images have been classified into the category of Versailles. In the category of Paris, 20 images have been classified into the category of the Arch of Triumph while 10 images have been classified into the category of the Eiffel Tower. The remaining 30 images have been classified into the category of the Notre Dame Cathedral under the category of Paris. Under the category of the Notre Dame Cathedral, 15 images have been classified into the category "In Front Of The Cathedral" while 5 images have been classified into the category "Outside the Cathedral". The remaining 10 images have been classified into the category "Inside The Cathedral" under the category of the Notre Dame Cathedral.

The importance degree setting unit 30 calculates the degree of importance for each of the categories through weighted addition of the number of images in the category, the number of categories related to the category, and the number of hierarchical levels below the category according to Equation (1) below:

$$\text{weight} = a1 \times (\text{the number of images in the category}) + \\ b1 \times (\text{the number of categories related to the category}) + \\ c1 \times (\text{the number of levels below the category}) \quad (1)$$

where a1, b1, and c1 are weighting coefficients (in this embodiment, a1=b1=c1=1).

The categories related to the category refer to the categories at the same level of the category and sharing the same category immediately above the category. Therefore, in this embodiment, the related categories refer to the categories of Paris, bus ride, and Versailles. In addition, the categories of the Arch of Triumph, the Eiffel Tower, and the Notre Dame Cathedral are also regarded as the related categories. Likewise, the categories "In Front Of The Cathedral", "Outside the Cathedral", and "Inside The Cathedral" are also regarded as the related categories.

Figure 5:
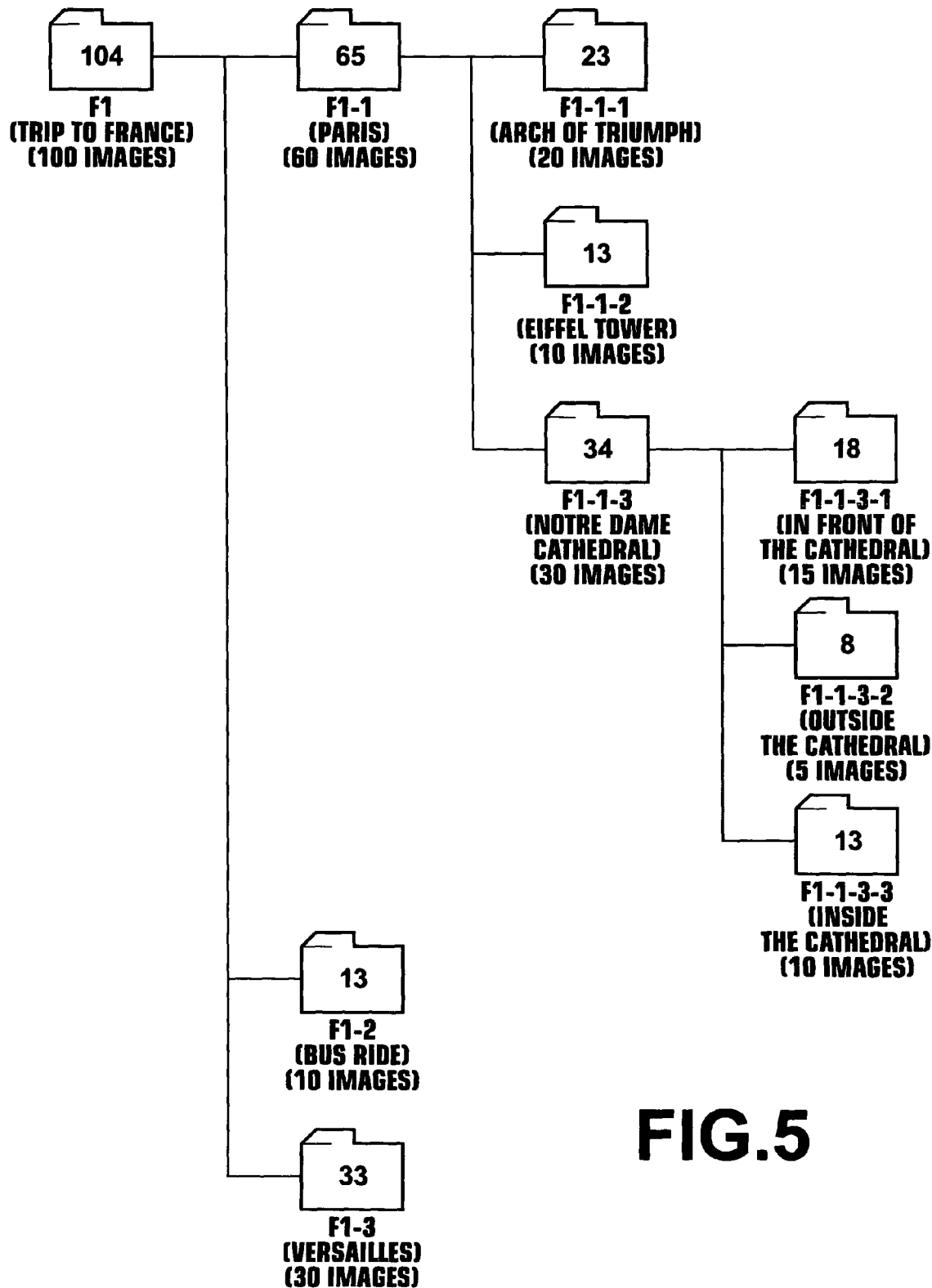
FIG. 5 shows the folder structure after the classification with degrees of importance calculated according to Method 1.

For the category "Trip to France", the number of the images in the category is 100, while the number of related categories and the number of lower-level categories are 1 and 3, respectively. Therefore, the degree of importance is found to be 104. The degrees calculated in this manner are shown in FIG. 5. This method of degree calculation is referred to as Method 1 below.

In Method 1, the weighting coefficients are all 1. However, the weighting coefficients may be changed according to importance of the number of images in the category, or the number of categories related to the category, or the number of levels below the category.

The degrees of importance may also be calculated according to Equation (2) below, through weighted multiplication of the number of images in the category, the number of categories related to the category, and the number of hierarchical levels from the uppermost level to the category:

$$\text{weight} = a2 \times (\text{the number of images in the category}) \times \\ (\text{the number of categories related to the category}) \times \\ (\text{the number of levels from the top level}) \quad (2)$$

where a2 is a weighting coefficient (in this embodiment, a2=1).

Figure 6:
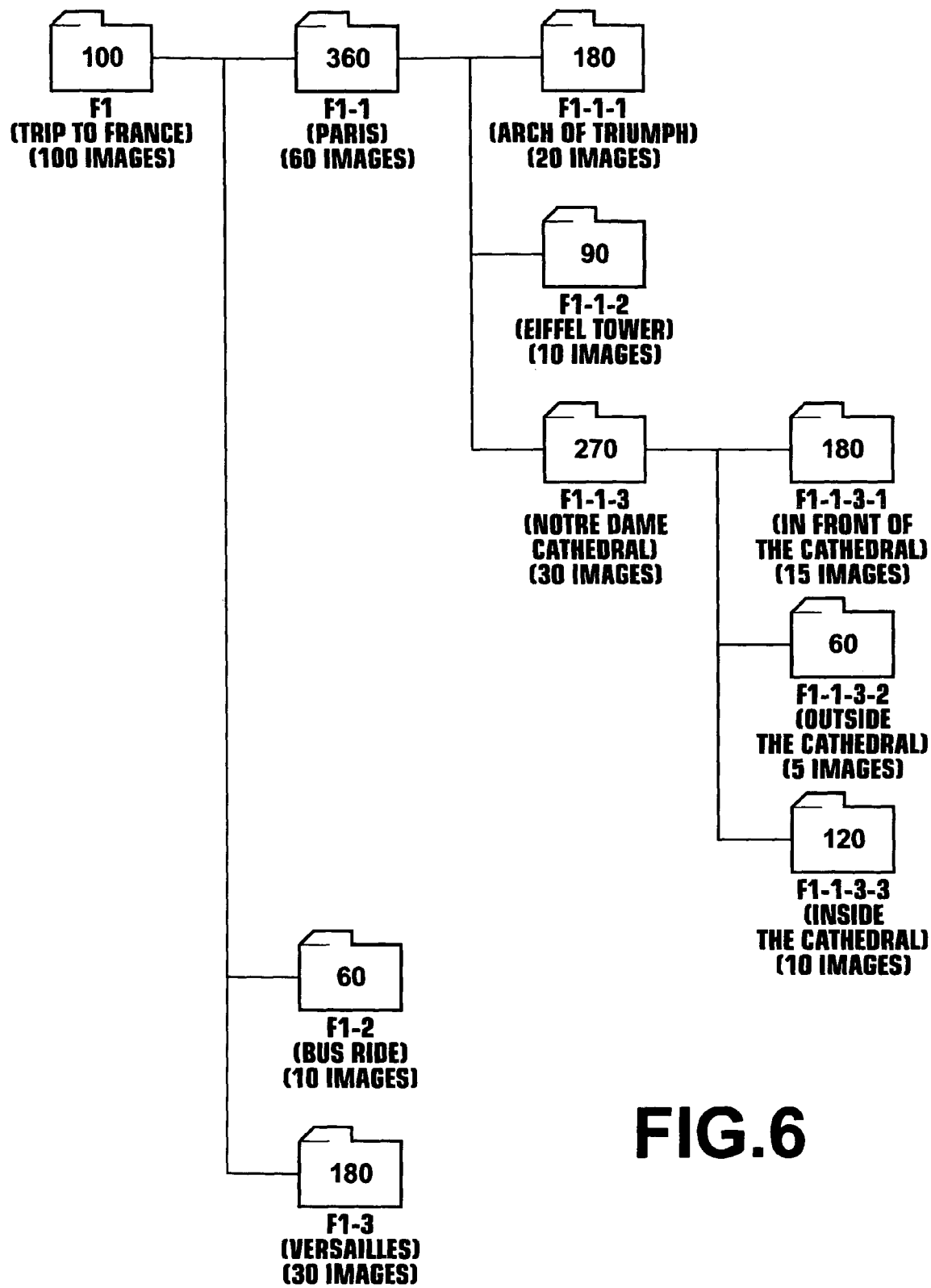
FIG. 6 shows the folder structure after the classification with degrees of importance calculated according to Method 2.

For the category "Trip To France", the number of images in the category is 100, while the number of related categories and the number of levels from the top to the category are 1 and 1, respectively. Therefore, the degree of importance is found to be 100. The degrees calculated in this manner are shown in FIG. 6. This method of degree calculation is referred to as Method 2 below.

In Method 2, the weighting coefficient a2 is 1. However, the weighting coefficient may be changed to another value.

Figure 7:
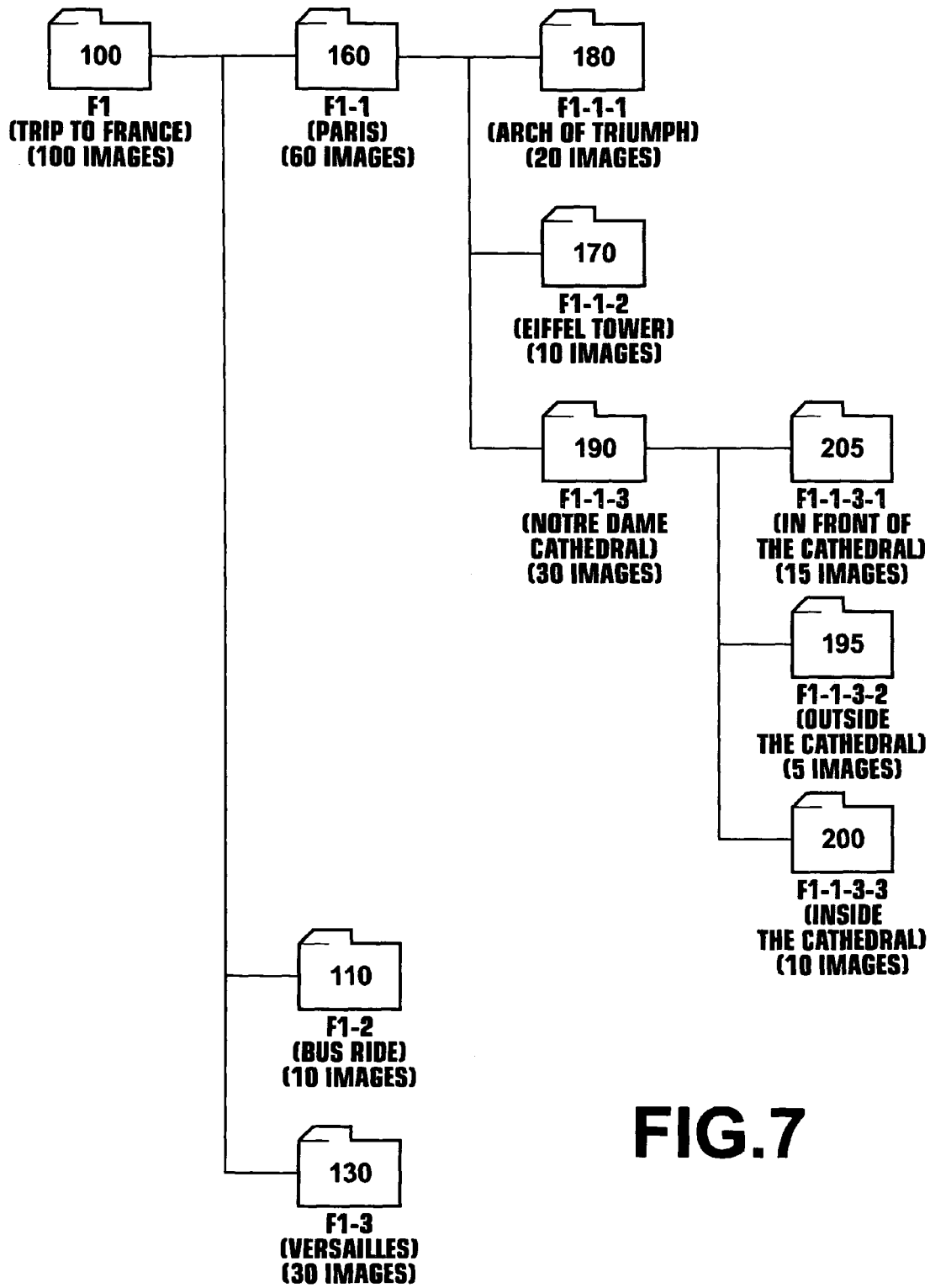
FIG. 7 shows the folder structure after the classification with degrees of importance calculated according to Method 3.

The degrees of importance may be calculated by weighted addition of the number of images in the category and the number of images in the category or categories above the category. For example, the number of images in the category "In Front Of The Cathedral" is 15 while the number of images in the category of the Notre Dame Cathedral that is immediately above the category "In Front Of The Cathedral" is 30. The number of images in the category of Paris, which is the category immediately above the category of the Notre Dame Cathedral, is 60, while the number of images in the category of trip to France immediately above is 100. Therefore, the degree of importance for the category "In Front Of The Cathedral" is 15+30+60+100=205, if the weighting coefficients are 1 for all the categories. Furthermore, the number of images in the category of the Arch of Triumph is 20 while the number of images in the category of Paris, which is the category immediately above the category of the Arch of Triumph, is 60. The number of images in the category of trip to France immediately above is 100. Therefore, the degree of importance for the category of the Arch of Triumph is 20+60+100=180, if the weighting coefficients are 1 for all the categories. The degrees calculated in this manner are shown in FIG. 7, and this method of calculation is referred to as Method 3.

In Method 3, all the weighting coefficients are 1. However, depending on which of the levels is important, the weighting coefficients can be changed.

Figure 8:
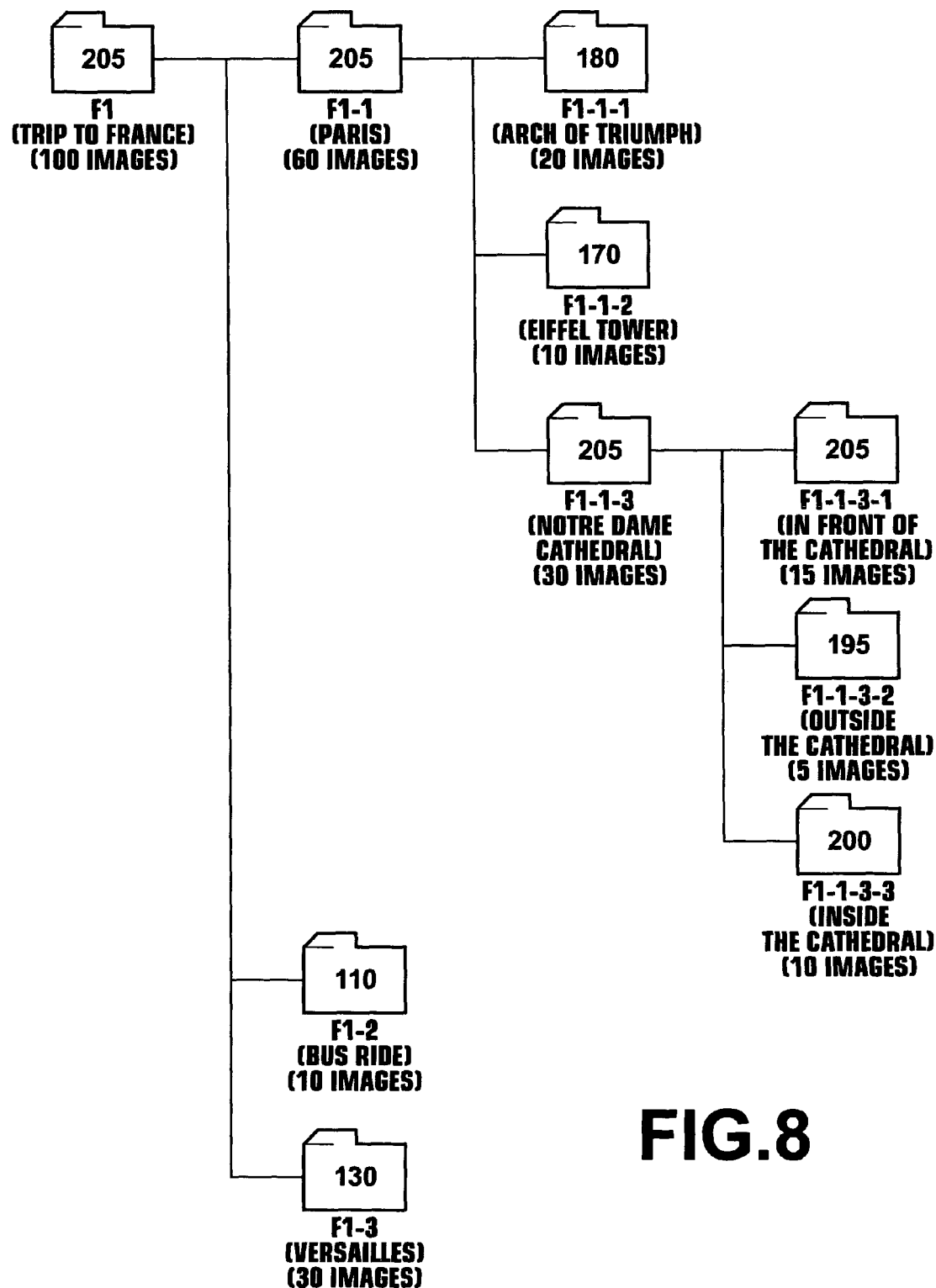
FIG. 8 shows the folder structure after the classification with degrees of importance calculated according to Method 4.

Furthermore, the degrees of importance may be calculated for the categories at the lowermost level and used for the category immediately above. The degrees of importance for the categories at the lowermost level may be calculated according to any one of Methods 1 to 3. The degrees of importance for the respective categories are shown in FIG. 8 for the case where the degrees for the lowermost-level categories are calculated according to Method 3. This calculation method is referred to as Method 4.

Although values of the degrees are different for the cases of calculation by Methods 1 to 4, order of the calculated degrees for the categories at the same level is found to be the same for all the cases. For example, at the level immediately below the category of Paris, the degrees of importance are higher in order of the Notre Dame Cathedral, the Arch of Triumph, and the Eiffel Tower. At the level immediately below the category of the Notre Dame Cathedral, the degrees are higher in order of "In Front Of The Cathedral", "Inside The Cathedral", and "Outside The Cathedral".

Figure 9:
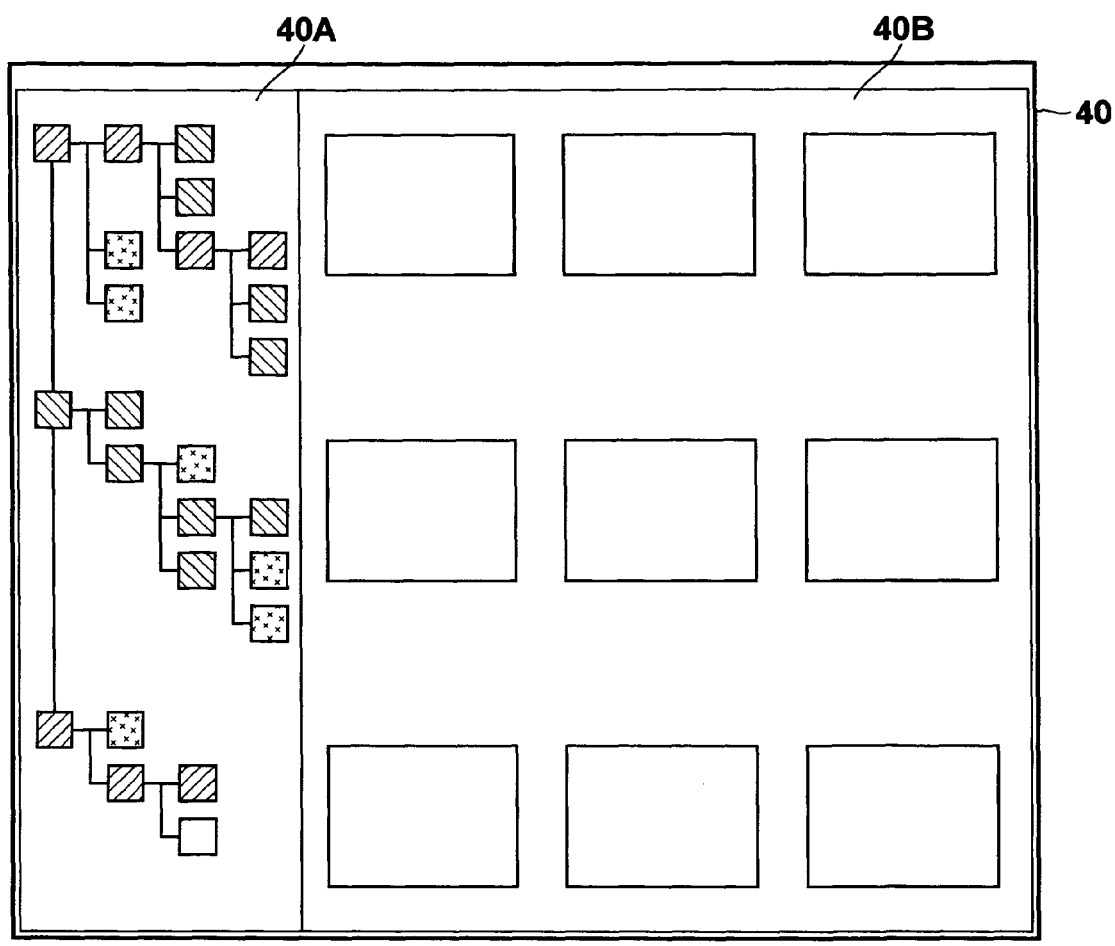
FIG. 9 shows an image catalog screen in the first embodiment (part 1)

When the CPU 12 starts the viewer software for viewing the images stored in the hard disc 24, the display control unit 32 displays the degrees of importance set by the importance degree setting unit 30 in an image catalog screen displayed by the viewer software on the display unit 18. FIG. 9 shows an example of the image catalog screen. As shown in FIG. 9, an image catalog screen 40 includes a folder field 40A for showing the folder structure stored in the hard disc 24 and a catalog display field 40B for displaying a catalog of thumbnail images regarding the images in one of the folders selected in the folder field 40A.

In the folder field 40A, the folder structure corresponding to the hierarchical categories is shown. The display control unit 32 sets ranks 1 to 4 to the categories according to the degrees of importance set by the importance degree setting unit 30. The display control unit 32 then colors the folders according to the ranks for display of the folder structure in the folder field 40A. For example, the folder or folders ranked $1^{st}$ is/are colored in pink, while the folder or folders ranked $2^{nd}$ is/are colored in orange. The folder or folders ranked $3^{rd}$ is/are colored in yellow and the folder or folders ranked $4^{th}$ is/are colored in green.

The ranks according to the degrees of importance are for example determined to be the $1^{st}$, $2^{nd}$, $3^{rd}$, and $4^{th}$ if the values of the degrees calculated according to Method 4 are more than 200, more than 150 but less than 200, more than 100 but less than 150, and less than 100, respectively.

Figure 10:
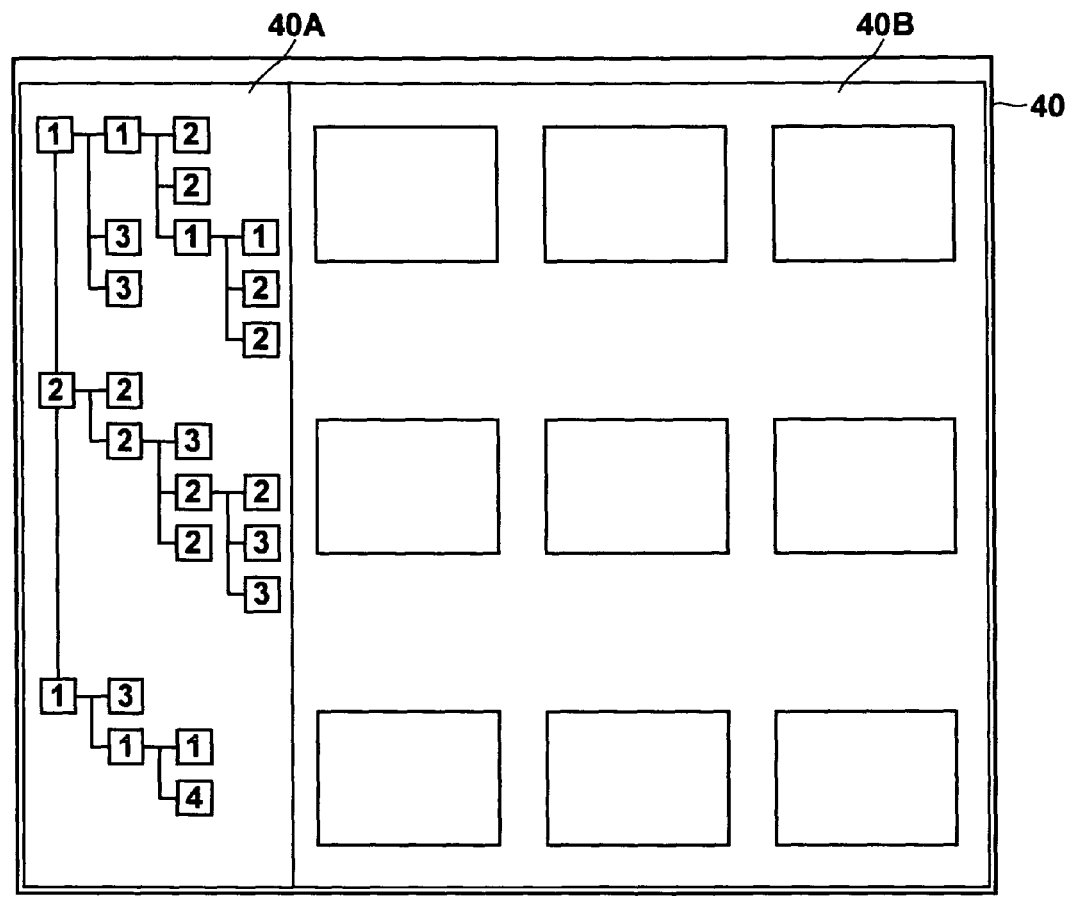
FIG. 10 shows the image catalog screen in the first embodiment (part 2)

As shown in FIG. 10, the ranks of the degrees may be displayed as values in addition to the coloring according to the degrees. Furthermore, marks or graphs according to the degrees may be displayed.

Figure 11:
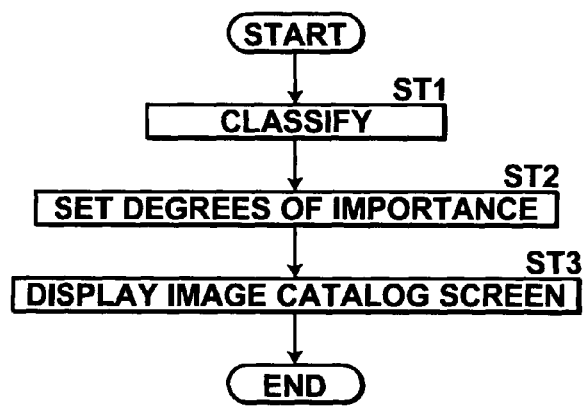
FIG. 11 is a flow chart showing a procedure carried out in the first embodiment.

A procedure carried out in the first embodiment will be described below. FIG. 11 is a flow chart showing the procedure carried out in the first embodiment. Image data sets have been read from the memory card 2 and stored in the folder desired by the user in the hard disc 24. The procedure starts when the user starts the viewer software and inputs an instruction to classify the images from the input unit 16. The image classification unit 28 classifies the image data sets into the hierarchical categories as has been described above (Step ST1).

The importance degree setting unit 30 sets the degrees of importance for the respective categories (Step ST2). The display control unit 32 then displays the image catalog screen 40 on the display unit 18 with the degrees being visually perceptible in the screen (Step ST3) to end the procedure.

As has been described above, in the first embodiment, the degree of importance for each of the categories is set according to at least one of: the number of images in the category, the number of images in an upper-level category, the number of categories related to the category, the number of levels below the category, and the number of levels from the uppermost level to the level of the category. Therefore, without a burden on the user, which of the categories has important images can be understood.

By displaying the degrees of importance for the respective categories, the user can understand the degrees of importance for the respective categories by glancing at the result of display.

Figure 12:
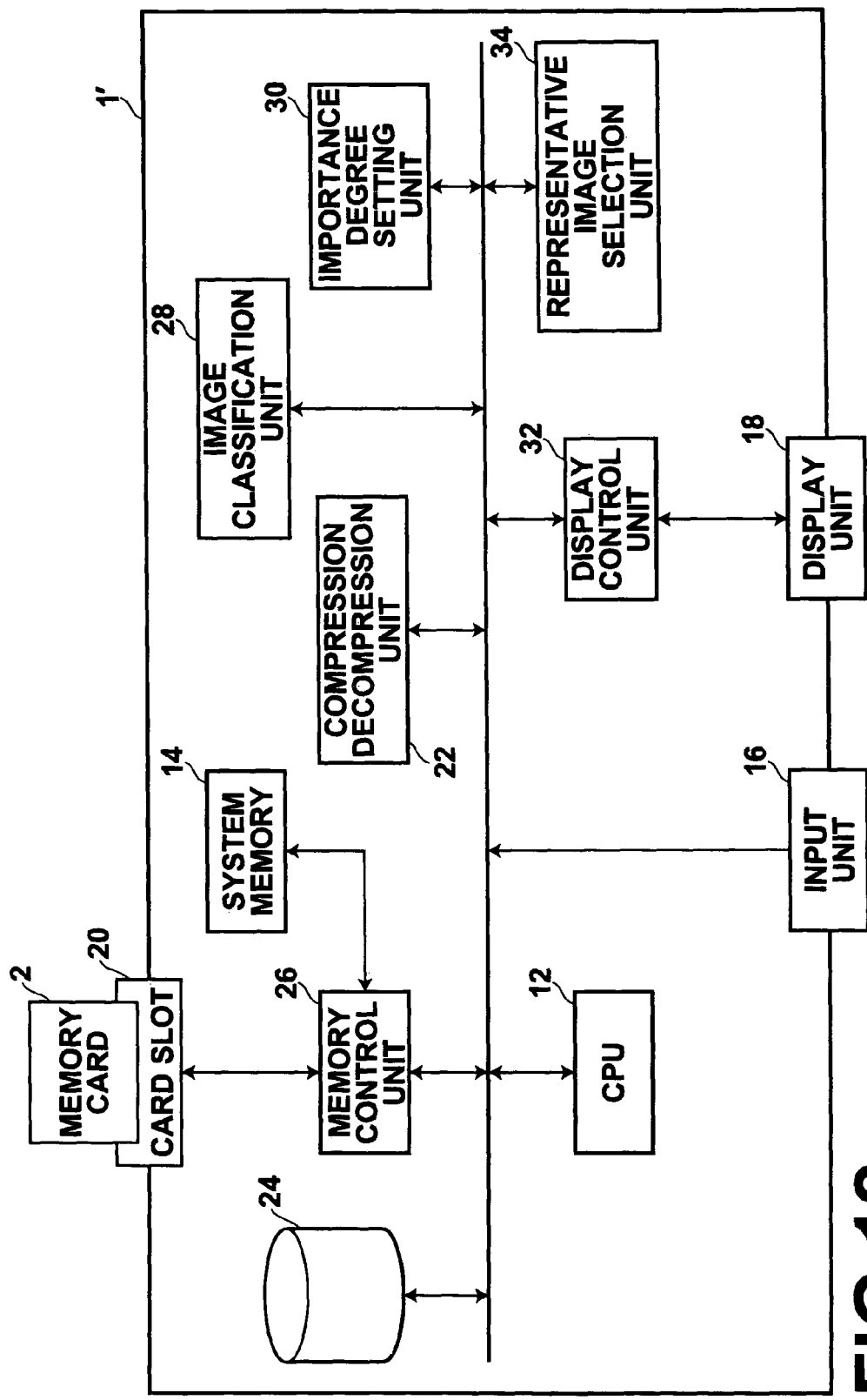
FIG. 12 is a block diagram showing the configuration of an importance degree setting apparatus according to a second embodiment of the present invention.

A second embodiment of the present invention will be described next. FIG. 12 is a block diagram showing the configuration of an importance degree setting apparatus according to the second embodiment of the present invention. In the second embodiment, the same elements as in the first embodiment have the same reference numbers, and detailed description thereof will be omitted. An importance degree setting apparatus 1' in the second embodiment has a representative image selection unit 34 for selecting representative images from a part of the categories whose degree or degrees of importance is/are high, which is a difference from the first embodiment.

Figure 13:
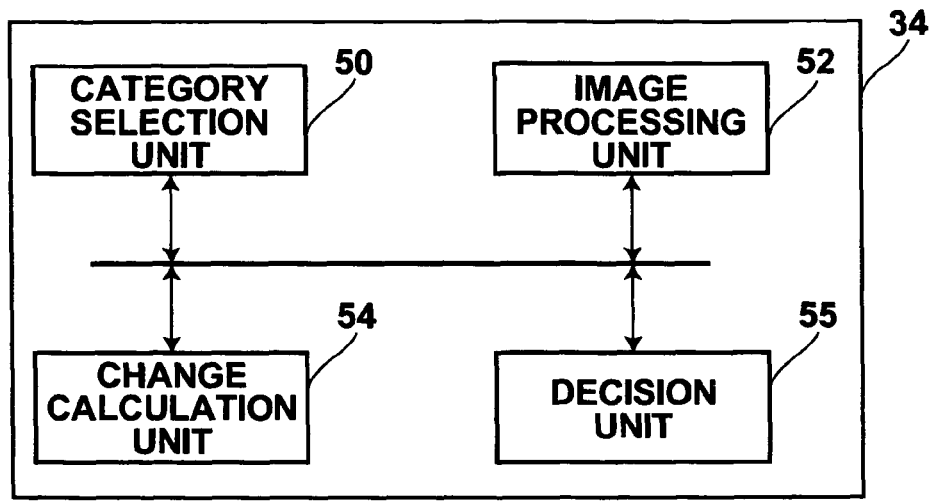
FIG. 13 is a block diagram showing the configuration of a representative image selection unit.

FIG. 13 is a block diagram showing the configuration of the representative image selection unit 34. As shown in FIG. 13, the representative image selection unit 34 comprises a category selection unit 50, an image processing unit 52, a change calculation unit 54, and a decision unit 56.

The category selection unit 50 selects the category having the highest value of the degree from the categories whose degrees of importance have been set. For example, in the first embodiment, the category "In Front Of The Cathedral" under the category of the Notre Dame Cathedral is selected in the case where the degrees have been calculated according to Method 4.

The image processing unit 52 obtains processed image data sets by carrying out at least one of: gradation correction processing, color correction processing, lightness correction processing, white balance correction processing, saturation correction processing, sharpness processing, noise reduction processing, red-eye correction processing, and skin enhancement processing on all the image data sets in the selected category.

The change calculation unit 54 calculates a representative quantity of changes in pixel values corresponding to each other in each of processed images represented by one of the processed image data sets and a non-processed image represented by a corresponding one of the image data sets before the image processing, for all the image data sets in the selected category. As the changes in the pixel values can be used changes in the pixel values themselves (such as square roots of squares of differences ΔR, ΔG, and ΔB in RGB values between the corresponding pixels in the processed images and the non-processed images in the case where the pixel values comprise RGB values) and absolute values of differences in luminance values found from the RGB values, for example. In this embodiment, a mean of the changes in the pixel values is used as the representative quantity, which is not necessarily limited thereto. As long as the changes in the pixel values can be represented, any value such as a median of the changes in the pixel values can be used.

The decision unit 56 sorts the images in ascending order of the representative quantity, and determines three of the images whose values of the representative quantity are the smallest, the second smallest, and the third smallest as the representative images.

Figure 14:
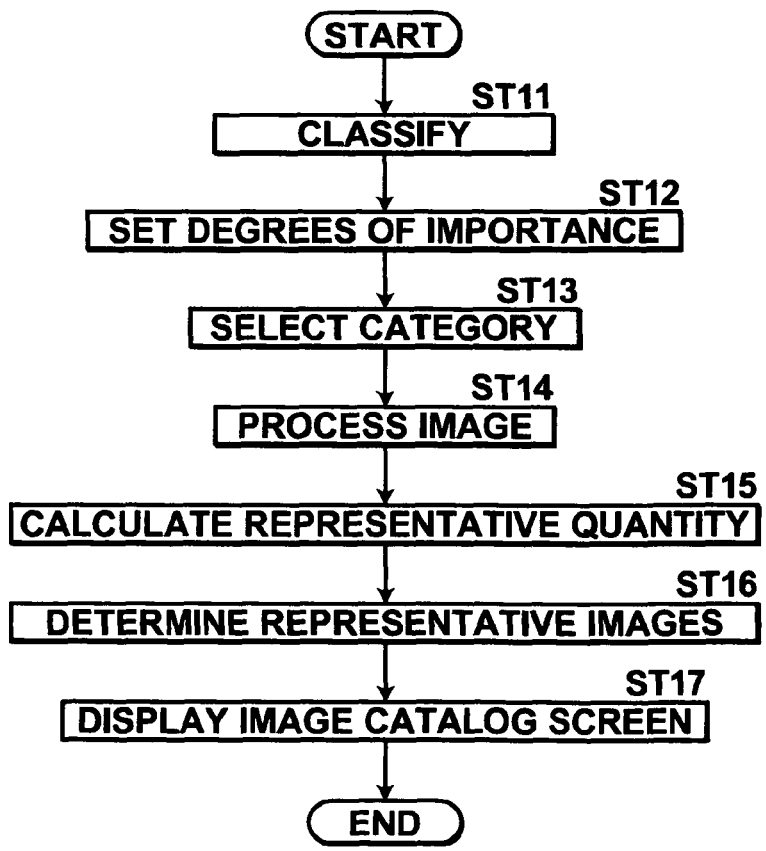
FIG. 14 is a flow chart showing a procedure carried out in the second embodiment.

A procedure carried out in the second embodiment will be described next. FIG. 14 is a flow chart showing the procedure in the second embodiment. The procedure starts when the user starts the viewer software and inputs an instruction to classify the images from the input unit 16. The image classification unit 28 classifies the image data sets into the hierarchical categories as has been described above (Step ST11).

The importance degree setting unit 30 sets the degrees of importance for the respective categories (Step ST12), and the category selection unit 50 in the representative image selection unit 34 selects the category of the highest degree (Step ST13). The image processing unit 52 then carries out the image processing on all the images included in the selected category to obtain the processed image data sets (Step ST14), and the change calculation unit 54 calculates the representative quantity in the changes between the processed images and the non-processed images (Step ST15). The decision unit 56 then determines the representative images (Step ST16).

The display control unit 32 displays an image catalog screen on the display unit 18 with the degrees being visually perceptible (Step ST17) to end the procedure.

Figure 15:
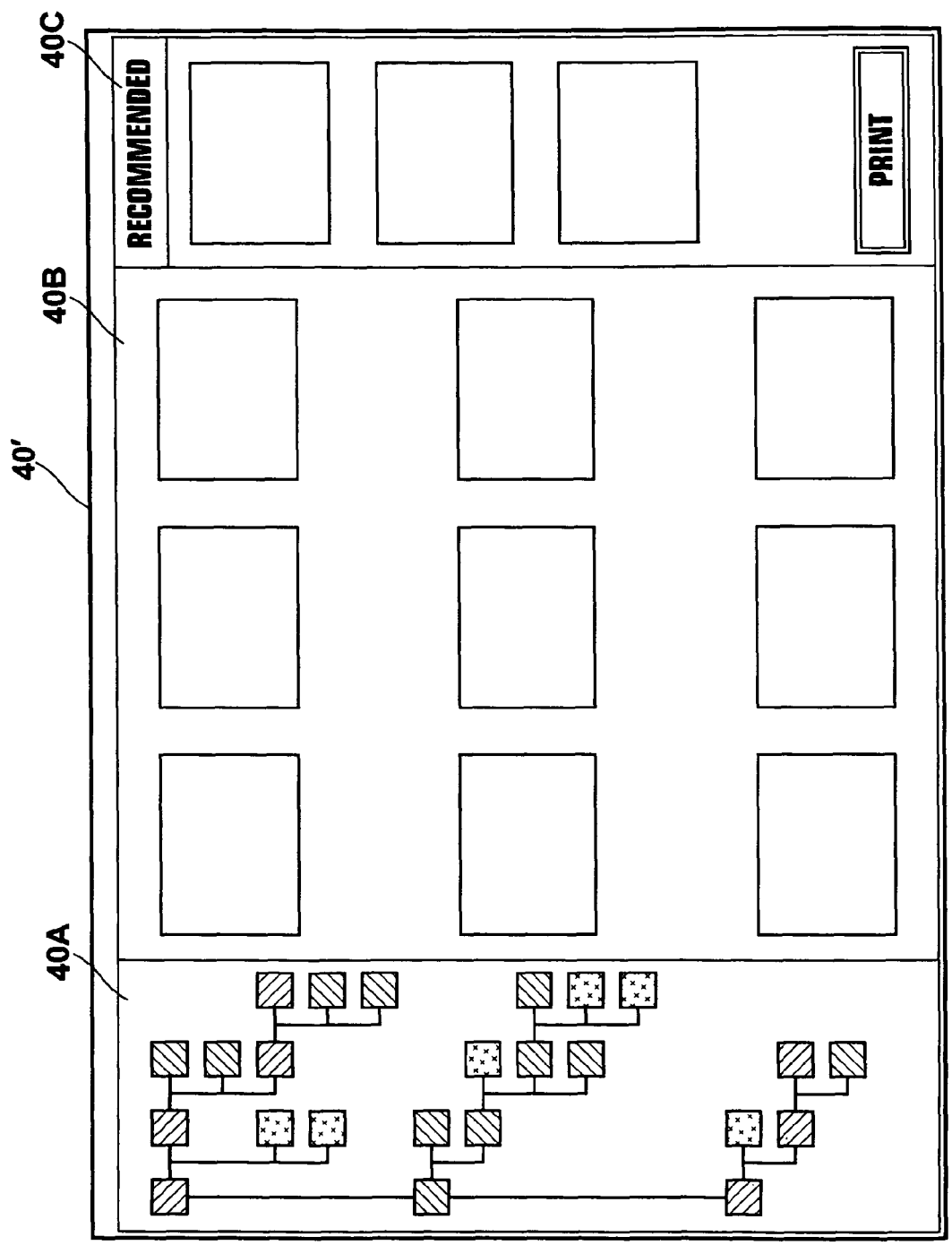
FIG. 15 shows an image catalog screen in the second embodiment.

FIG. 15 shows the image catalog screen in the second embodiment. As shown in FIG. 15, an image catalog screen 40' includes a representative image display field 40C for displaying the representative images, in addition to the folder field 40A and the catalog display field 40B.

In the representative image display field 40C are shown a catalog of thumbnail images of the representative images selected by the decision unit 56, characters notifying that the representative images are recommended images, and a Print button for generating order information for placing a printing order.

By viewing the images shown in the representative image display field 40C, the user understands which images are recommended.

When the user clicks the Print button after selecting a desired one of the images in the representative image display field 40C, the order information for placing a printing order regarding the image is generated, and the image data set representing the representative image is copied in a folder for printing order. The user can place the printing order regarding the representative image by sending the image data set representing the representative image and the order information to a server of a DPE store after accessing the server. The printing order can also be placed by bringing a recording medium such as a memory card recorded with the image data set of the representative image and the order information.

As has been described above, in the second embodiment, the representative images are selected from the category of the highest degree of importance and displayed. Therefore, the user can easily understand which images are the representative images. Since the representative images have been selected from the category of the highest degree of importance, the images are often important for the user. Therefore, the user can be induced to use the representative images for ordering a print or the like, by display Of the representative images.

If the representative quantity of the changes is small, a change between the processed image and the non-processed image corresponding to the value is small, meaning less necessity of the image processing. In other words, the image has been photographed well. If this image is selected and printed, a print of high quality can often be obtained. Therefore, by displaying the Print button in the representative image display field 40C as in the second embodiment, the user can be lead to print the image having been photographed well.

In the second embodiment, eight images whose values of the representative quantity are the smallest are selected as the representative images. However, the image whose file name comes first or last in the category upon sorting the file names of the image data sets in the category may be selected as the representative image.

In the second embodiment, the representative images have been selected from the category of the highest degree of importance. However, one representative image can be selected from each of a predetermined number (such as 3) of the categories ranked highly according to the weights.

In the first and second embodiments described above, the images have been classified into the hierarchical categories based on the intervals in the time and date of photography. However, since GPS information is added to the images in the case where photography has been carried out with use of a camera enabling acquisition of GPS information representing the latitude and the longitude of a photography location, the images may be classified hierarchically for each of photography locations according to the GPS information.

Furthermore, the images may be classified into categories according to schedule information representing a schedule of the user, as has been described in Japanese Unexamined Patent Publication No. 2003-108973. Alternatively, the images may be classified into categories based on a relationship between characteristic quantities calculated from the images, as has been described in U.S. Pat. No. 6,907,141.

Furthermore, the user may classify the images manually according to his/her preference.

Figure 16:
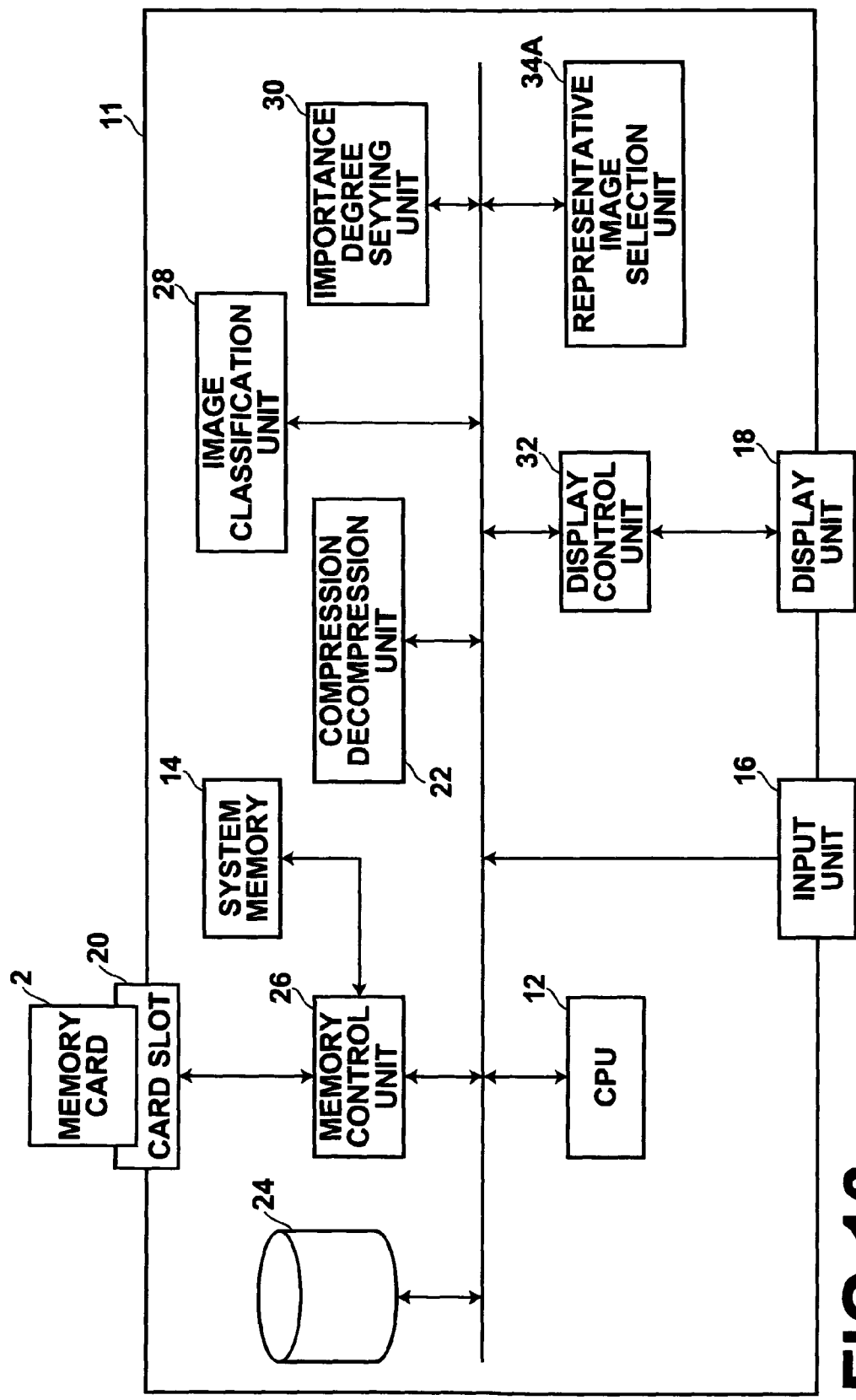
FIG. 16 is a block diagram showing the configuration of a representative image selection apparatus of a third embodiment of the present invention.

An embodiment of a representative image selection apparatus of the present invention will be described next. FIG. 16 is a block diagram showing the configuration of a representative image selection apparatus of a third embodiment of the present invention. In the third embodiment, the same elements as in the importance degree setting apparatus in the second embodiment have the same reference numbers, and detailed description thereof will be omitted. A representative image selection apparatus 11 in the third embodiment has a representative image selection unit 34A for selecting a predetermined number (referred to as N) of representative images from a part of the categories whose degree or degrees of importance is/are high among the categories respectively given the degrees, which is a difference from the weight setting apparatus in the second embodiment.

Figure 17:
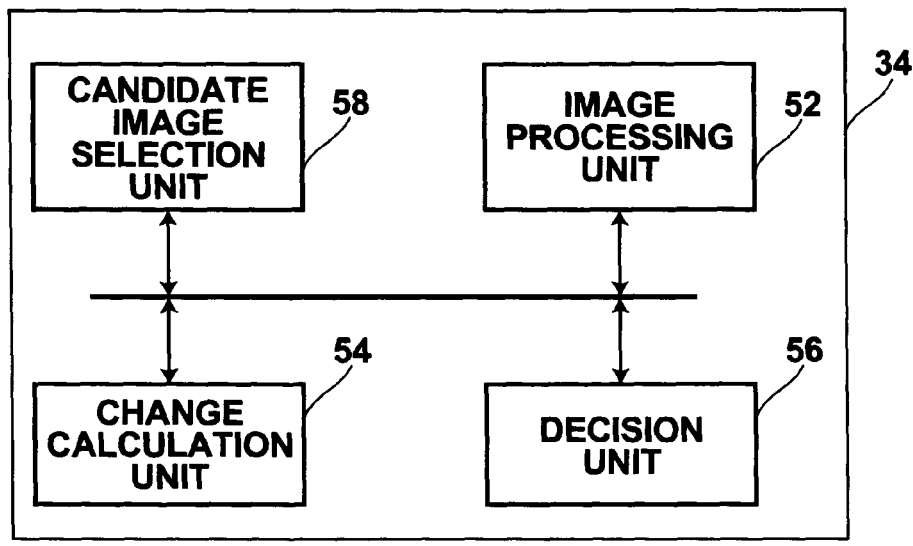
FIG. 17 is a block diagram showing the configuration of a representative image selection unit in the third embodiment.

FIG. 17 is a block diagram showing the configuration of the representative image selection unit 34A. As shown in FIG. 17, the representative image selection unit 34A has a candidate image selection unit 58, instead of the category selection unit 50 in the representative image selection unit 34 in the second embodiment.

Figure 18:
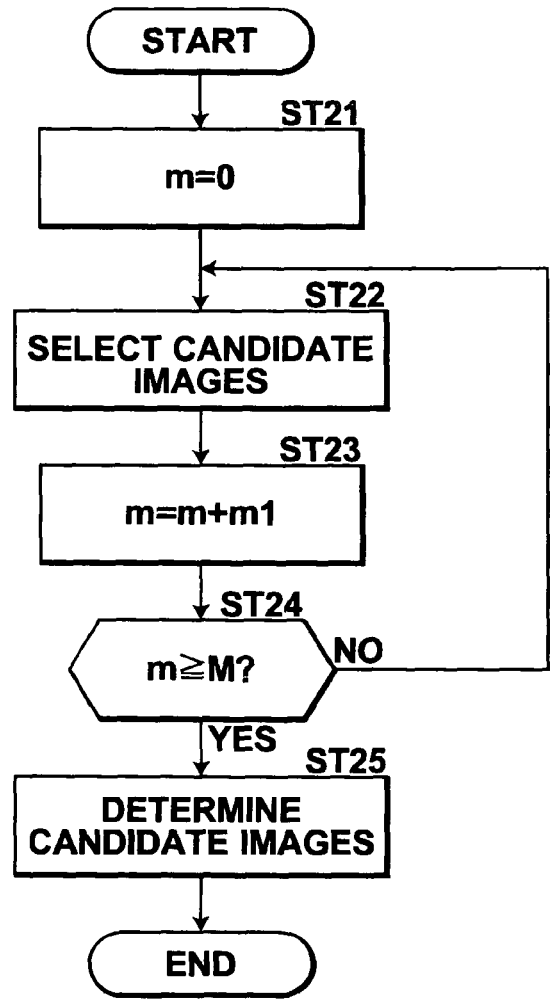
FIG. 18 is a flow chart showing a procedure of candidate image selection.

The candidate image selection unit 58 selects candidate images for the representative image from the category or categories of high importance among the categories at the lowermost level. FIG. 18 is a flow chart showing a procedure for candidate image selection carried out by the candidate image selection unit 58. In this embodiment, at least M ($M \geq N$) candidate images are selected.

Firstly, the number of the candidate images (referred to as m) is set to 0 (Step ST21), and the category of the highest degree of importance is selected from the categories at the lowermost level from which no candidate images have been selected. All the images in the category are then selected as the candidate images (Step ST22). If m=0, the candidate images are selected from the category of the highest degree at the lowermost level. For example, in the case where the degrees of importance have been set in the above manner, the candidate images are selected from the category "In Front Of The Cathedral" at the level below the category of the Notre Dame Cathedral.

The number m of the candidate images is then changed to m1 that is the number of the images selected at Step ST22 (Step ST23), and judgment is made as to whether m (the number of the candidate images) $\geq$ M is satisfied (Step ST24). If the result the result at ST24 is affirmative, all the candidate images selected at Step ST22 are finally determined as the candidate images (Step ST25) to end the procedure.

If the result at ST24 is negative, the procedure returns to Step ST22, and the procedure from Step ST22 is repeated.

In the procedure above, if the number of the images in the category of the highest degree at the lowermost level is smaller than M, the images in the category having the second-highest degree are added to the candidate images. Thereafter, the procedure from Step ST22 is repeated until the number of the candidate images becomes M or larger.

For example, in the case where the degrees of importance have been calculated in the manner described above, if the number M of the candidate images is 10, the 15 images in the category "In Front Of The Cathedral" under the level of the category of the Notre Dame Cathedral are selected as the candidate images. In the case where the number M of the candidate images is 20, the 25 images comprising the 15 images in the category "In Front Of The Cathedral" and the 10 images in the category "Inside The Cathedral" are selected as the candidate images.

In the third embodiment, the change calculation unit 54 may normalize the mean of the changes in the pixel values according to Equation (3) below for using the normalized value as the representative quantity:

$$\text{representative quantity} = (1 - \text{the mean of the changes}/\text{a maximum of the changes}) \times 100 \quad (3)$$

where the maximum is the largest value in the changes calculated for all the candidate images.

Figure 19:
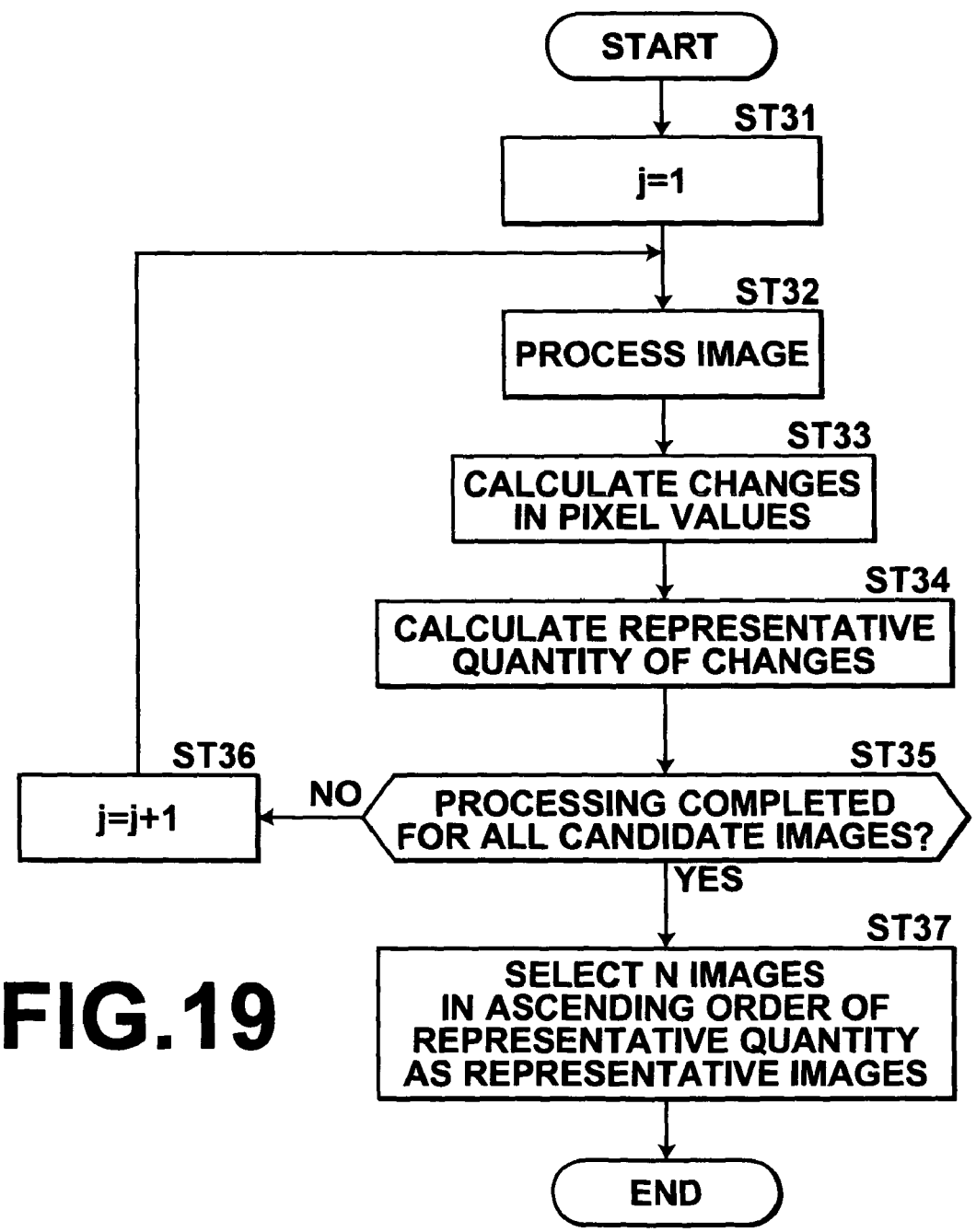
FIG. 19 is a flow chart showing a procedure for representative image selection in the third embodiment.

FIG. 19 is a flow chart for representative image selection carried out by the image processing unit 52, the change calculation unit 54, and the decision unit 56 in the third embodiment. The CPU 12 lets j=1 (where j ranges from 1 to M) for causing the image data set representing the candidate image whose file name comes first to become the image data set to be processed (Step ST31). The image processing unit 52 then carries out the image processing on the image data set to obtain the processed image data set (Step ST32).

The change calculation unit 54 calculates the changes in the pixel values between the processed image and the non-processed image (Step ST33). The change calculation unit 54 further calculates the representative quantity of the changes in the pixel values (Step ST34).

The CPU 12 judges whether all the image data sets representing the candidate images have been processed (Step ST35). If the result the result at ST35 is negative, the CPU 12 lets j=j+1 for causing the image data set having the next file name to be processed (Step ST36). The procedure then returns to Step ST32. If the result at Step ST35 is affirmative, the N images from the smallest value of the representative quantity to the $N^{th}$ smallest value of the representative quantity are selected as the representative images (Step ST37) to end the procedure.

In the procedure described above, in the case where the images in the category "In Front Of The Cathedral" have been selected as the candidate images, the N representative images are selected therefrom. In the case where the images in the categories "In Front Of The Cathedral" and "Inside The Cathedral" have been selected as the candidate images, the N representative images are selected therefrom. At this time, the representative images are selected from at least one of the categories "In Front Of The Cathedral" and "Inside The Cathedral". Therefore, no representative images may be selected from some (either one in this case) of the categories from which the candidate images have been selected.

Figure 20:
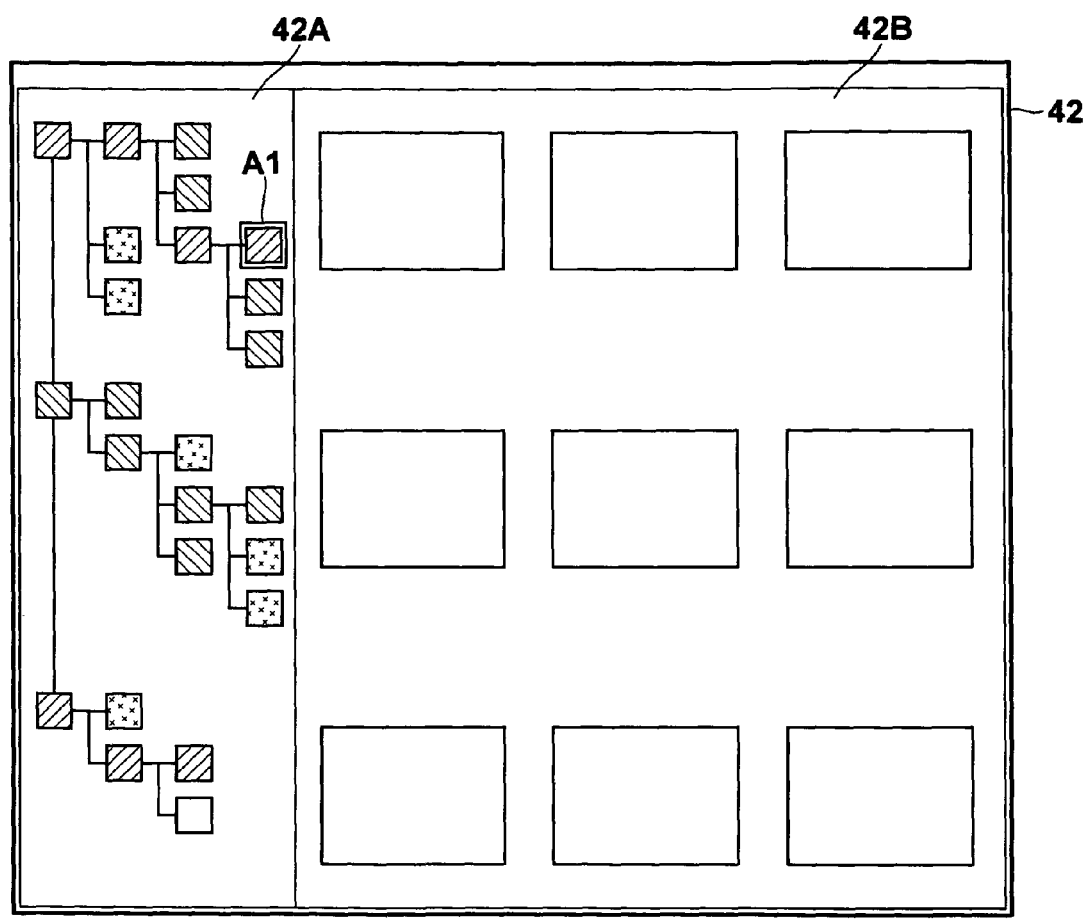
FIG. 20 shows an image catalog screen in the third embodiment (part 1)

FIG. 20 shows an example of an image catalog screen in the third embodiment. As shown in FIG. 20, an image catalog screen 42 includes a folder field 42A for showing the folder structure stored in the hard disc 24 and a catalog display field 42B for displaying a catalog of thumbnail images regarding the images in the folder selected in the folder field 42A (the folder surrounded by a rectangle A1 in FIG. 20).

The hierarchical folder structure is shown in the folder field 42A, in the same manner as the folder field 40A in the first embodiment. In the folder field 42A in the image catalog screen 42 in FIG. 20, the uppermost level represents the folder storing the images of the trip to France.

Figure 21:
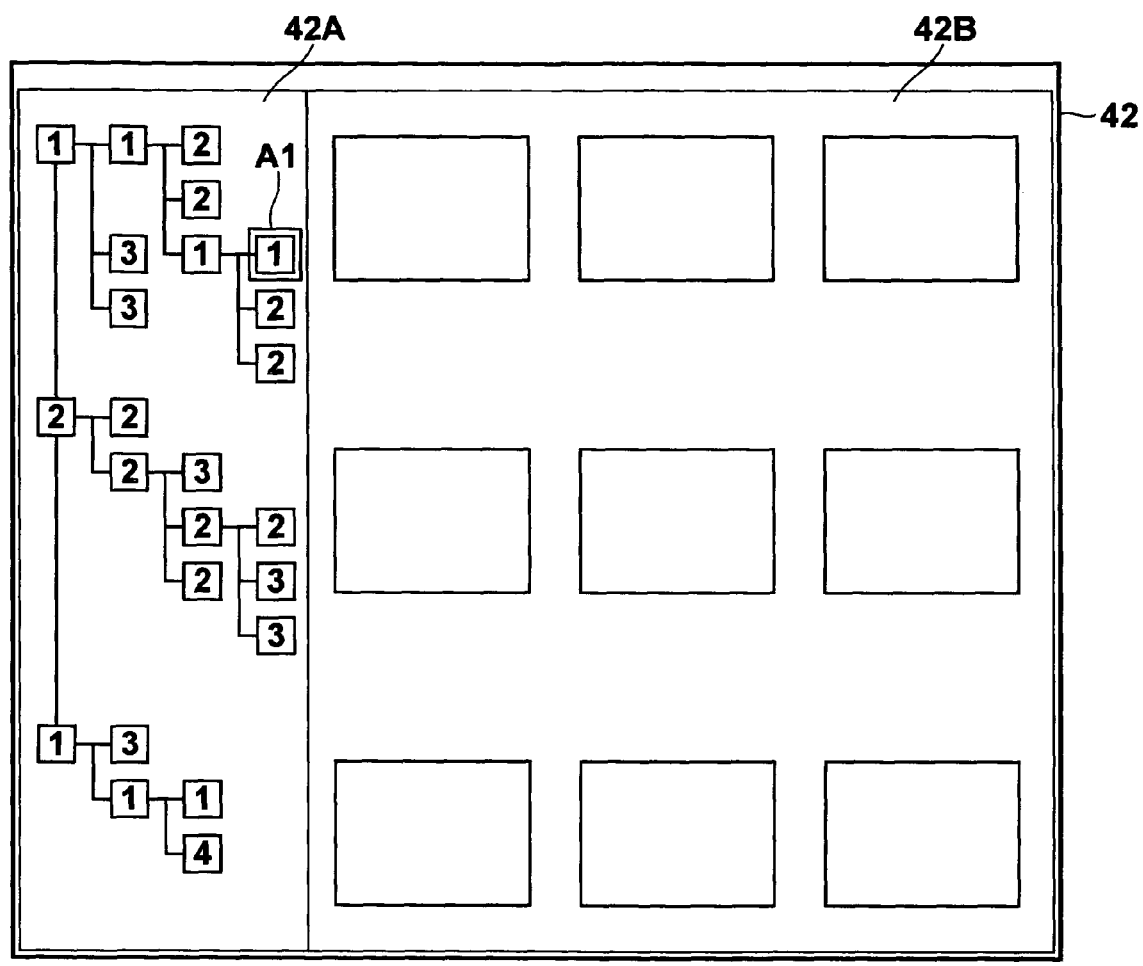
FIG. 21 shows the image catalog screen in the third embodiment (part 2)

As shown in FIG. 21, the degrees of importance may be displayed not only by colors but also as the values representing the ranks thereof. In addition, marks or graphs according to the degrees may be displayed.

In the catalog display field 42B, in the case where the user has selected one of the folders at the lowermost level, a catalog of the thumbnail images of the images in the selected folder is displayed. However, in the case where the user has selected one of the folders above the lowermost level, the representative images at the level immediately below are displayed by being reduced.

Figure 22:
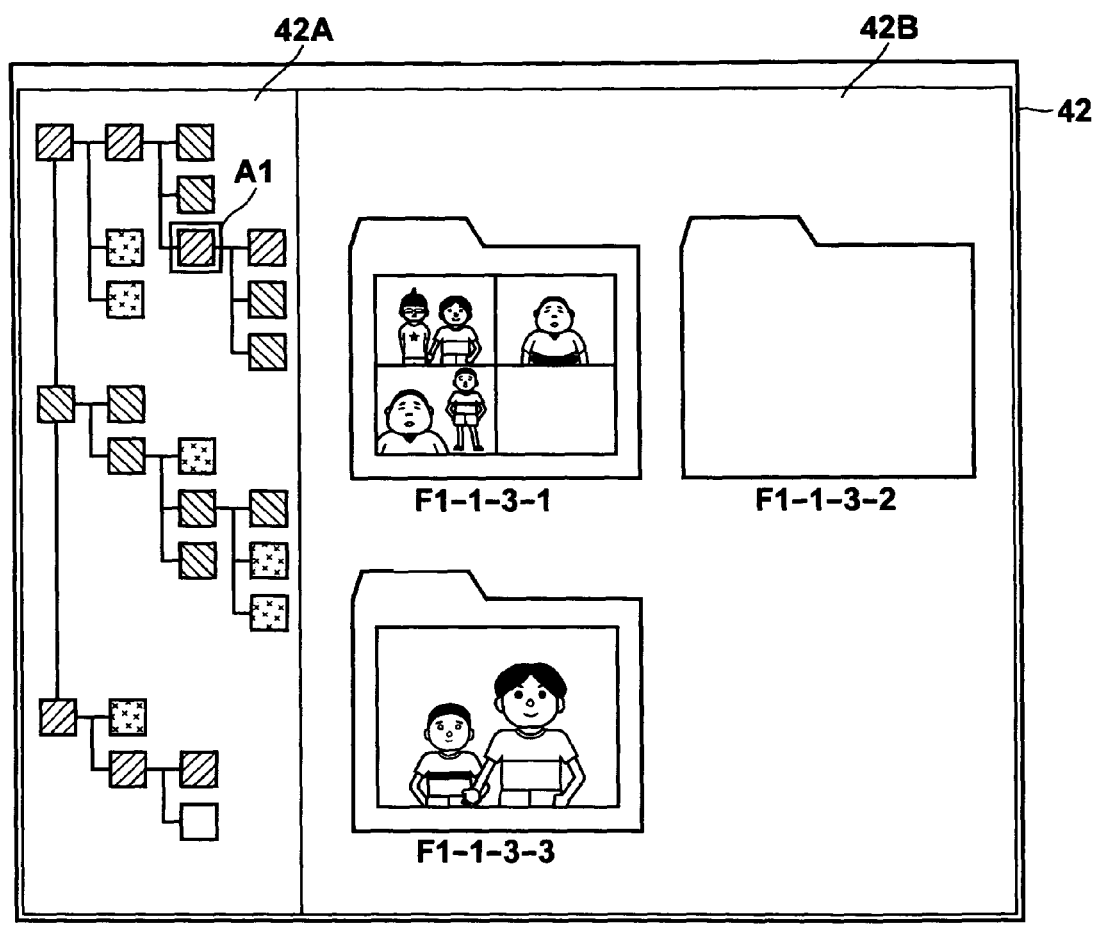
FIG. 22 shows the image catalog screen in the third embodiment (part 3)

FIG. 22 shows an example of the image catalog screen 42 wherein the folders are displayed by being reduced in the catalog display field 42B. In this embodiment, the user has selected the folder F1-1-3 (the folder of the Notre Dame Cathedral) under the folder F1 (the folder of the trip to France), and the representative images comprise 3 images from the folder F1-1-3-1 (the folder "In Front Of The Cathedral") and 1 image from the folder F1-1-3-3 (the folder "Inside The Cathedral").

As shown in FIG. 22, the 3 folders F1-1-3-1, F1-1-3-2, and F1-1-3-3 immediately below the selected folder F1-1-3 are displayed by being reduced in the catalog display field 42B. The thumbnail images of the 3 representative images from the folder F1-1-3-1 and the thumbnail image of the 1 image from the folder F1-1-3-3 are displayed in the corresponding folders. Since no representative images have been selected from the folder F1-1-3-2, no thumbnail images are displayed therein.

Figure 23:
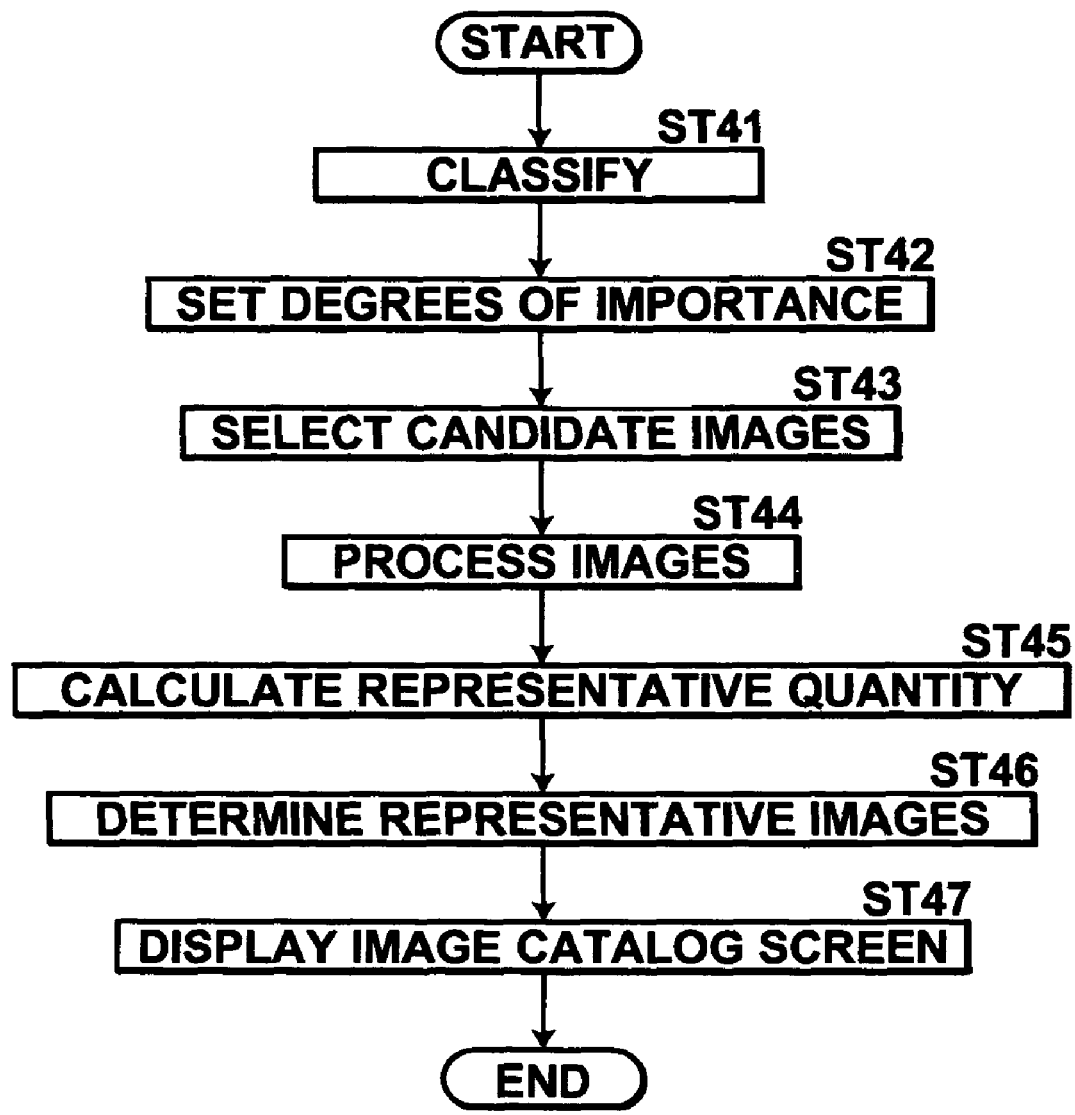
FIG. 23 is a flow chart showing a procedure carried out in the third embodiment.

A procedure carried out in the third embodiment will be described below. FIG. 23 is a flow chart showing the procedure carried out in the third embodiment. The image data sets have been read from the memory card 2 and stored in the folder desired by the user in the hard disc 24. The procedure starts when the user starts the viewer software and inputs an instruction to classify the images from the input unit 16. The image classification unit 28 classifies the image data sets into the hierarchical categories as has been described above (Step ST41).

The importance degree setting unit 30 sets the degrees of importance for the respective categories (Step ST42), and the candidate image selection unit 58 in the representative image selection unit 34A selects the candidate images (Step ST43). The image processing unit 52 carries out the image processing on all the image data sets representing the selected candidate images for obtaining the processed image data sets (Step ST44), and the change calculation unit 54 calculates the representative quantity of the changes between the respective processed images and the corresponding non-processed images (Step ST45). The decision unit 56 then determines the representative images (Step ST46).

The display control unit 32 displays the image catalog screen with the degrees of importance being visually perceptible on the display unit 18 (Step ST47) to end the procedure.

As has been described above, according to the third embodiment, the candidate images are selected from the category or categories whose degree or degrees is/are high, and the representative images are selected from the candidate images. Since the candidate images are selected from the category or categories of high importance, the candidate images are often important for the user. Therefore, according to this embodiment, the representative images that are important for the user can be selected with certainty.

Since the candidate images are selected from the category or categories of high importance and the representative images are selected from the candidate images, time necessary for selecting the representative images can be shorter than in the case of selecting the representative images from the entire images.

If the representative quantity of the changes in the pixel values corresponding to each other is small between one of the processed images obtained by carrying out image processing for quality enhancement and the corresponding non-processed image, a change between the processed image and the non-processed image is small. In other words, the image needs less image processing, meaning that the image has been photographed well and is of high quality.

For this reason, the representative quantity of the changes in the pixel values is calculated for each of the selected candidate images, and the representative images are selected as the predetermined number of the images in ascending order of the representative quantity. In this manner, the images of high quality can be selected as the representative images.

Furthermore, by letting the representative quantity be the value obtained by normalization of the mean of the changes in the pixel values, a maximum value and a minimum value of the representative quantity can be understood clearly. Therefore, the representative quantity can be easy to understand.

In the third embodiment, the N images having the smallest to $N^{th}$ smallest values of the representative quantity are selected as the representative images. However, the file names of the candidate images may be sorted so that N images including the file name that comes first or last after sorting can be selected as the representative images. Alternatively, N of the candidate images selected randomly may be used as the representative images.

In the third embodiment described above, the images have been classified into the hierarchical categories based on the intervals in the time and date of photography. However, since GPS information is added to the images in the case where photography has been carried out with use of a camera enabling acquisition of the GPS information representing the latitude and the longitude of a photography location, the images may be classified for each of photography locations according to the GPS information.

Furthermore, the images may be classified into categories according to schedule information representing a schedule of the user, as has been described in Japanese Unexamined Patent Publication No. 2003-108973. Alternatively, the images may be classified into categories based on a relationship between characteristic quantities calculated from the images, as has been described in U.S. Pat. No. 6,907,141.

Furthermore, the user may classify the images manually according to his/her preference.

In the third embodiment, the importance degree setting unit 30 sets the degrees of importance for the respective categories according to any one of Methods 1 to 4. However, the user may set the degrees of importance manually according to his/her preference.

Figure 24:
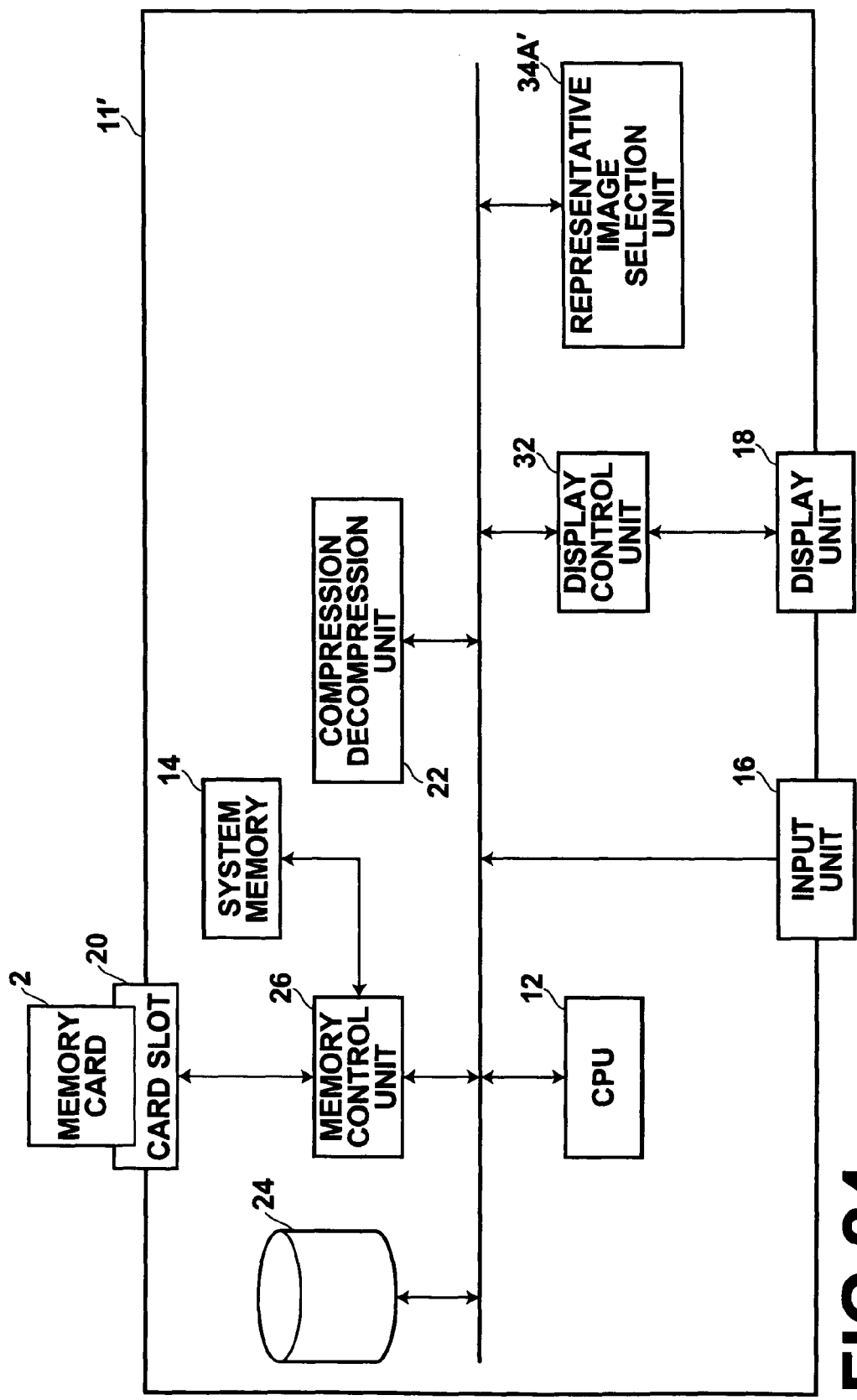
FIG. 24 is a block diagram showing the configuration of a representative image selection apparatus of a fourth embodiment of the present invention.

A fourth embodiment of the present invention will be described below. FIG. 24 is a block diagram showing the configuration of a representative image selection apparatus of the fourth embodiment of the present invention. In the fourth embodiment, the same elements as in the third embodiment have the same reference numbers, and detailed description thereof will be omitted. A representative image selection apparatus 11' in the fourth embodiment does not have the image classification unit 28 and the importance degree setting unit 30 in the third embodiment. The representative image selection apparatus 11' in the fourth embodiment has a representative image selection unit 34A' for selecting the representative images from the images stored in the folder desired by the user in the hard disc 24 without classification of the images into the categories, which is a difference from the third embodiment.

Figure 25:
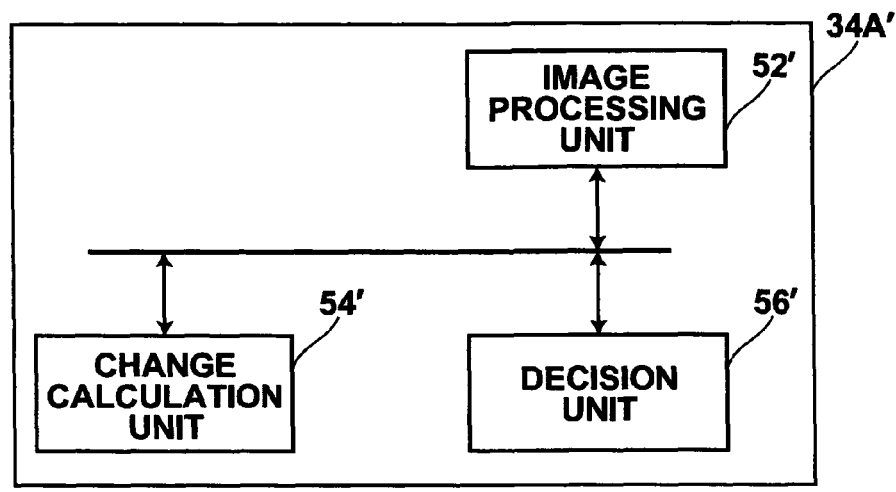
FIG. 25 is a block diagram showing the configuration of a representative image selection unit in the fourth embodiment.

FIG. 25 is a block diagram showing the configuration of the representative image selection unit 34A'. As shown in FIG. 25, the representative image selection unit 34A' has an image processing unit 52', a change calculation unit 54', and a decision unit 56' corresponding respectively to the image processing unit 52, the change calculation unit 54, and the decision unit 56 in the representative image selection unit 34A in the third embodiment.

Figure 26:
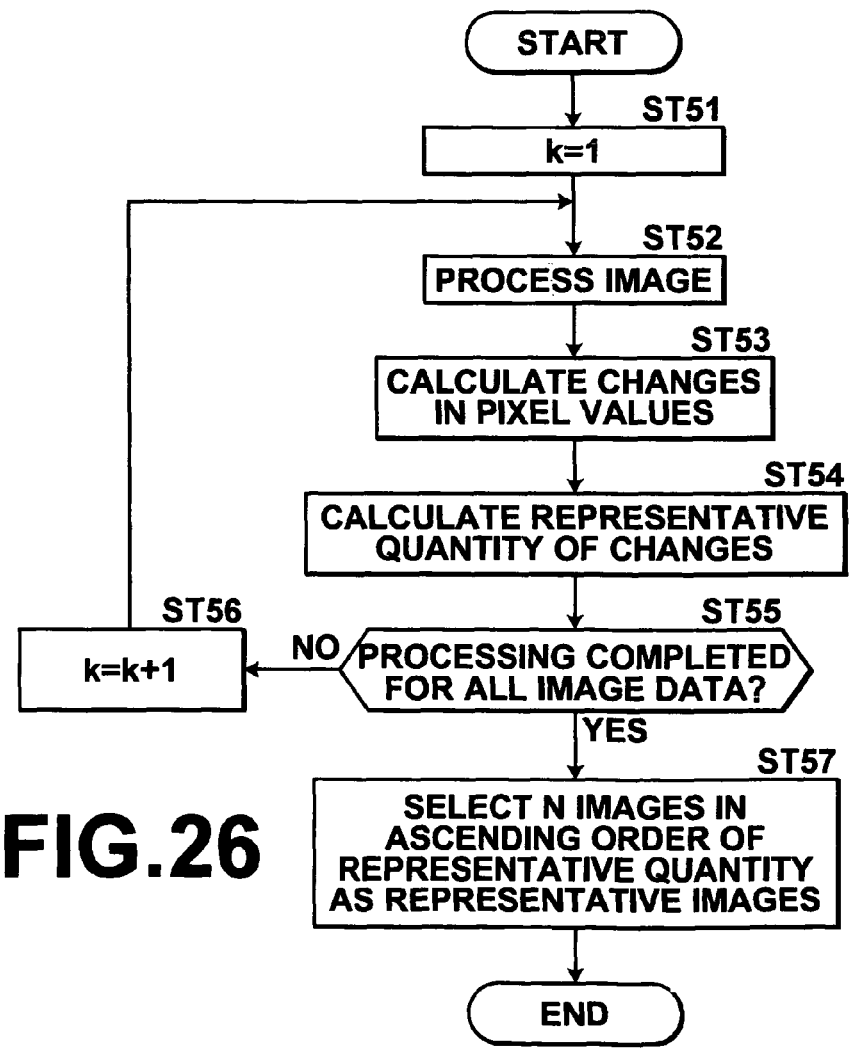
FIG. 26 is a flow chart showing a procedure of candidate image selection in the fourth embodiment.

A procedure carried out in the fourth embodiment will be described next. FIG. 26 is a flow chart showing the procedure carried out by the representative image selection unit 34A' in the fourth embodiment. The CPU 12 lets k=1 (where k refers to the number of image data sets stored in the folder desired by the user) for causing the image data set whose file name comes first to be processed (Step ST51). The image processing unit 52' then carries out the image processing on the image data to obtain the processed image data set (Step ST52).

The change calculation unit 54' calculates the changes in the pixel values between the processed image and the non-processed image (Step ST53). The change calculation unit 54' further calculates the representative quantity of the changes in the pixel values (Step ST54).

The CPU 12 judges whether all the image data sets stored in the desired folder have been processed (Step ST55). If the result the result at ST55 is negative, the CPU 12 lets k=k+1 for causing the image data set having the next file name to be processed (Step ST56) The procedure then returns to Step ST52. If the result at Step ST55 is affirmative, the N images from the smallest representative quantity to the fifth smallest representative quantity are selected as the representative images (Step ST57) to end the procedure.

AS has been described above, according to the fourth embodiment, the representative images can be selected from the images stored in the desired folder even without classification of the images into the categories.

In the third and fourth embodiments described above, the representative quantity is the mean of the changes in the pixel values or the normalized mean. However, in the case where the user has reproduced the images stored in the desired folder for a plurality of times, the normalized mean of the changes in the pixel values may be corrected so that the representative quantity becomes smaller as the reproduction time becomes longer, through recording of the reproduction time according to the method described in U.S. Patent Application Publication No. 20030169288. In this manner, a part of the images whose reproduction time is long is likelier to be selected as the representative image or images.

Furthermore, the time and date of last reproduction of each of the images may be recorded so that the normalized mean of the changes in the pixel values may be corrected in such a manner that the representative quantity becomes larger as the time elapsed from the last reproduction time to the time of representative image selection becomes longer. In this manner, a part of the images reproduced recently tends to be selected as the representative image or images while a part of the images whose reproduction has not been carried out for a long time is unlikely to be selected as the representative image or images. In this manner, the representative images can be selected according to preference of the user.

Figure 27:
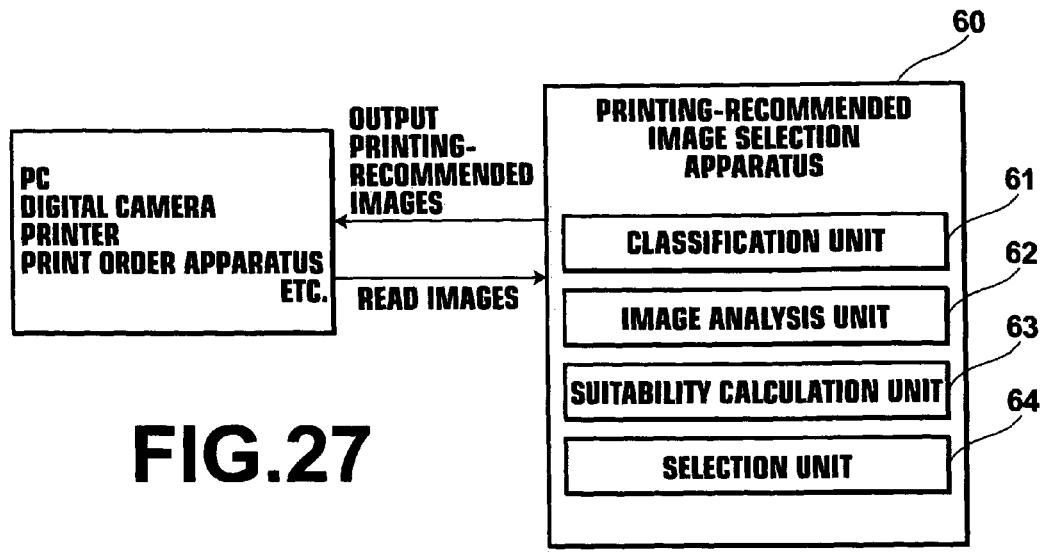
FIG. 27 is a block diagram showing the configuration of a printing-recommended image selection apparatus of a fifth embodiment of the present invention.

An embodiment of a printing-recommended image selection apparatus of the present invention will be described next. FIG. 27 is a block diagram showing the configuration of a printing-recommended image selection apparatus of a fifth embodiment of the present invention. The printing-recommended image selection apparatus of the present invention may be installed in a personal computer or a digital camera, or may be accessible as a separate apparatus.

As shown in FIG. 27, a printing-recommended image selection apparatus 60 comprises a classification unit 61 for classifying images input thereto into a plurality of categories, an image analysis unit 62 for analyzing the images, a suitability calculation unit 63 for calculating printing suitability based on the result the result of the classification and the result the result of the analysis, and a selection unit 64 for selecting a printing-recommended image from the images according to the printing suitability.

The printing-recommended image selection apparatus 60 has a function of reading images stored in a hard disc of a personal computer or in a memory card or the like of a digital camera, and is used by a user in a state where the apparatus can access the hard disc or the memory card or the like. The printing-recommended image selection apparatus 60 selects an image whose printing is recommended according to the printing suitability, and outputs the image to the personal computer or the digital camera.

The classification unit 61 classifies the images into the categories according to the method described in Japanese Unexamined Patent Publication No. 2001-112997 wherein the images are arranged along a time axis according to photography time information representing time and date of photography added to the images, and classified into the categories according to a difference in the photography time between two of the images neighboring each other along the time axis. Alternatively, the image classification unit 61 may classify the images into the categories corresponding to a schedule of the user with reference to schedule information representing the schedule, according to the method described in Japanese Unexamined Patent Publication No. 2003-108973. The image classification unit 61 may classify the images into the categories based on a relationship between characteristic quantities calculated from the images, according to the method described in U.S. Pat. No. 6,907,141.

The image classification unit 61 also sets the degrees of importance for the respective categories in the same manner as the importance degree setting unit 30 in the first embodiment, according to at least one of: the number of images in each of the categories, the number of images in an upper-level category, the number of categories related to the category, the number of hierarchical levels below the category, and the number of hierarchical levels from the top level to the level of the category.

The image classification unit 61 may classify the images into the same category if the images input thereto are similar to each other. Alternatively, the image classification unit 61 may also carry out scene analysis on the images so that the images can be classified into the same category if the images represent the same scene. As has been described in Japanese Unexamined Patent Publication No. 2004-206697, one of the images is used as a reference image, and the reference image and another one of the images are classified as similar images into one of the categories if similarity between the images is in a predetermined range. In this case, the similarity refers to a correlation value between the images, for example.

The scene analysis may be carried out according to a method described in Japanese Unexamined Patent Publication No. 2002-232728, for example. More specifically, three histograms are generated for hue, saturation, and lightness of each of the image, and the image is judged to be a normal image, an underexposure image, a backlight image, an overexposure image, a night view image, or a sunset image. Based on the scenes that have been judged, the images are classified into the categories.

The image analysis unit 62 carries out analysis on the input images regarding predetermined analysis items, and calculates an evaluation value for each of the items. More specifically, the image analysis unit 62 carries out the analysis for at least one of: whether lightness satisfies a predetermined condition, whether a blur is observed, whether a face is included, whether a skin color is preferable, face recognition (who has been photographed), facial expression (whether the person is smiling), and whether eyes are closed. Based on the result the result of the analysis, the image analysis unit 62 determines an evaluation value Ei (where i refers to a number for each of the items). In this embodiment, the image analysis unit 62 determines the evaluation values for all the items described above.

For lightness, the image analysis unit 62 finds a mean of all pixels for each of the images, and judges whether the mean exceeds a predetermined threshold value Th1. The image is judged to satisfy the predetermined condition of lightness if the mean exceeds the threshold value Th1. An evaluation value E1 is 1 for the image satisfying the predetermined condition. Otherwise, the evaluation value E1 is 0.

For blurriness, the image analysis unit 62 can use a method described in Japanese Unexamined Patent Publication No. 2004-295236 wherein each of the images is decomposed into a high frequency component, an intermediate frequency component and a low frequency component, and a degree of blur is judged based on a gain of the high frequency component. In this embodiment, the image analysis unit 62 judges whether the gain for the high frequency component of each of the images exceeds a predetermined threshold value Th2, and the image is judged to be not blurry if the gain exceeds the threshold value Th2. An evaluation value E2 is 1 for the image of no blur, while the value E2 is 0 if otherwise.

Regarding inclusion of face, the image analysis unit 62 can use a method for face detection by using a DWT coefficient obtained through wavelet transform of each of the images (see H. Schneiderman et al., "A statistical method for 3d object detection applied to faces and cars", in IEEE Conf. on Computer Vision and Pattern Recognition, 2000. pp. 746-751) as has been cited in Japanese Unexamined Patent Publication No. 2004-348733. An evaluation value E3 is 1 if the image includes a face, while the value E3 is 0 if the image does not include a face.

For judging whether a skin color is preferable in each of the images, a face is detected in the image according to the method described in Japanese Unexamined Patent Publication No. 2004-348733, and judgment is made as to whether a color of the detected face exceeds a reference value set for a preferable skin color determined in advance in a color space according to a method described in Japanese Unexamined Patent Publication No. 2004-180114. The image is judged to be an image wherein the skin color is preferable if the skin color exceeds the reference value. An evaluation value E4 is 1 for the image of preferable skin color, while the evaluation value E4 is 0 if otherwise.

Regarding face recognition, the user pre-registers with the printing-recommended image selection apparatus 60 a person the user wishes to include in an image, and whether the person is included is judged for each of the images. In the case where the person is in the image, an evaluation value E5 is 1. Otherwise, the evaluation value E5 is 0.

Regarding facial expression, judgment is made as to whether a face is smiling, according to a method described in Japanese Unexamined Patent Publication No. 2001-043345, for example. More specifically, characteristic vectors are stored in advance for recognizing facial expressions based on patterns of facial skin movement, regarding face images of various kinds of facial expressions. A characteristic vector is extracted from each of the images to be processed, and a distance between the characteristic vector and each of the characteristic vectors stored in advance is calculated. One of the facial expressions corresponding to the characteristic vector whose distance to the extracted characteristic vector is the shortest is judged to be the facial expression of the face in the image. If the face is judged to be smiling, an evaluation value E6 therefor is 2 while the value E6 is 1 if otherwise.

Regarding closed eyes, whether eyes are closed in a face is judged for each of the images according to a method described in Japanese Unexamined Patent Publication No. 2004-199386, for example. More specifically, filtering processing is carried out on parts of eyes in a face by using filters respectively corresponding to closed eyes and open eyes, and whether the eyes are closed or open is judged according to the result the result of the filtering processing. An evaluation value E7 is 1 for the image if the eyes are not closed therein, while the value E7 is 0 if otherwise.

The suitability calculation unit 63 calculates printing suitability P0 for each of the images based on the evaluation values E1 set by the image analysis unit 62 and the degrees of importance set by the image classification unit 61, according to Equation (4) below. Since the degrees of importance are for the categories into which the images have been classified and can be dealt with in the same manner as the evaluation values Ei, the degree of importance for the category including each of the images is used as an evaluation value E8.

$$P0 = \Sigma Ei \tag{4}$$

Therefore, the printing suitability P0 becomes larger if the lightness satisfies the predetermined condition, if no blur is observed, if the skin color is preferable, if a smile is observed, if eyes are not closed, and the degree of importance for the corresponding category is higher.

The selection unit 64 selects a predetermined number of images in descending order of the printing suitability calculated by the suitability calculation unit 63, as the printing-recommended image or images. The selection unit 64 then reads and outputs the selected printing-recommended image or images from the hard disc or the memory card of the personal computer or the like.

According to this configuration, automatic image selection can be realized in the same manner as the user selects the images to print.

Figure 28:
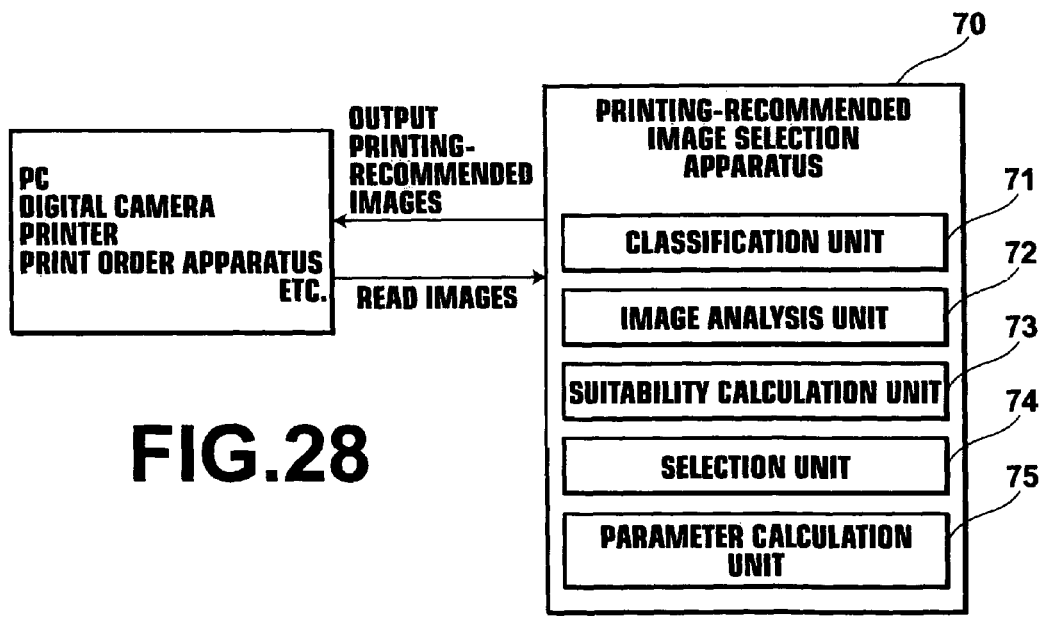
FIG. 28 is a block diagram showing the configuration of a printing-recommended image selection apparatus of a sixth embodiment of the present invention.

A sixth embodiment of the present invention will be described next. FIG. 28 is a block diagram showing the configuration of a printing-recommended image selection apparatus of the sixth embodiment of the present invention. As shown in FIG. 28, a printing-recommended image selection apparatus 70 in the sixth embodiment comprises a parameter calculation unit 75, in addition to a classification unit 71, an image analysis unit 72, a suitability calculation unit 73, and a selection unit 74 that are the same as the classification unit 61, the image analysis unit 62, the suitability calculation unit 63, and the selection unit 64 in the fifth embodiment.

The parameter calculation unit 75 calculates parameters that quantify preference of a user for an image to print, based on a characteristic of an image that the user actually viewed or printed. The parameters are found as weights Wi for the evaluation values Ei. More specifically, use history may be stored for the image actually used by the user for printing, viewing, or attachment to E-mail so that the image that has been used can be analyzed regarding the same analysis items as the image analysis unit 72. By comparing each of the analysis items, the parameter calculation unit 75 in this case sets the weights for the respective analysis items based on a statistical bias. Alternatively, the parameters may be calculated and updated when the use history is updated whenever the user uses the image. In this manner, values of the parameters representing preference of the user are updated to be more reliable and to reflect the preference better whenever the printing-recommended image selection apparatus is used. Since a newer image is likelier to be printed, the weights for an old image may be updated to be lower whenever a new image is input.

The suitability calculation unit 73 in the sixth embodiment calculates printing suitability P1 for an image from the evaluation values E1 and the parameters W1 according to Equation (5) below:

$$P1 = \Sigma Wi \cdot Ei \tag{5}$$

According to the configuration described above, automatic image selection can be realized with the preference of the user reflected in the same manner as in the case where the user himself/herself selects the image to print.

A seventh embodiment of the present invention will be described next. In the seventh embodiment, a personal computer has the printing-recommended image selection apparatus of the fifth or sixth embodiment.

The personal computer has the printing-recommended image selection apparatus by installation of the printing-recommended image selection apparatus therein or through access to the printing-recommended image selection apparatus as an external apparatus.

Figure 29:
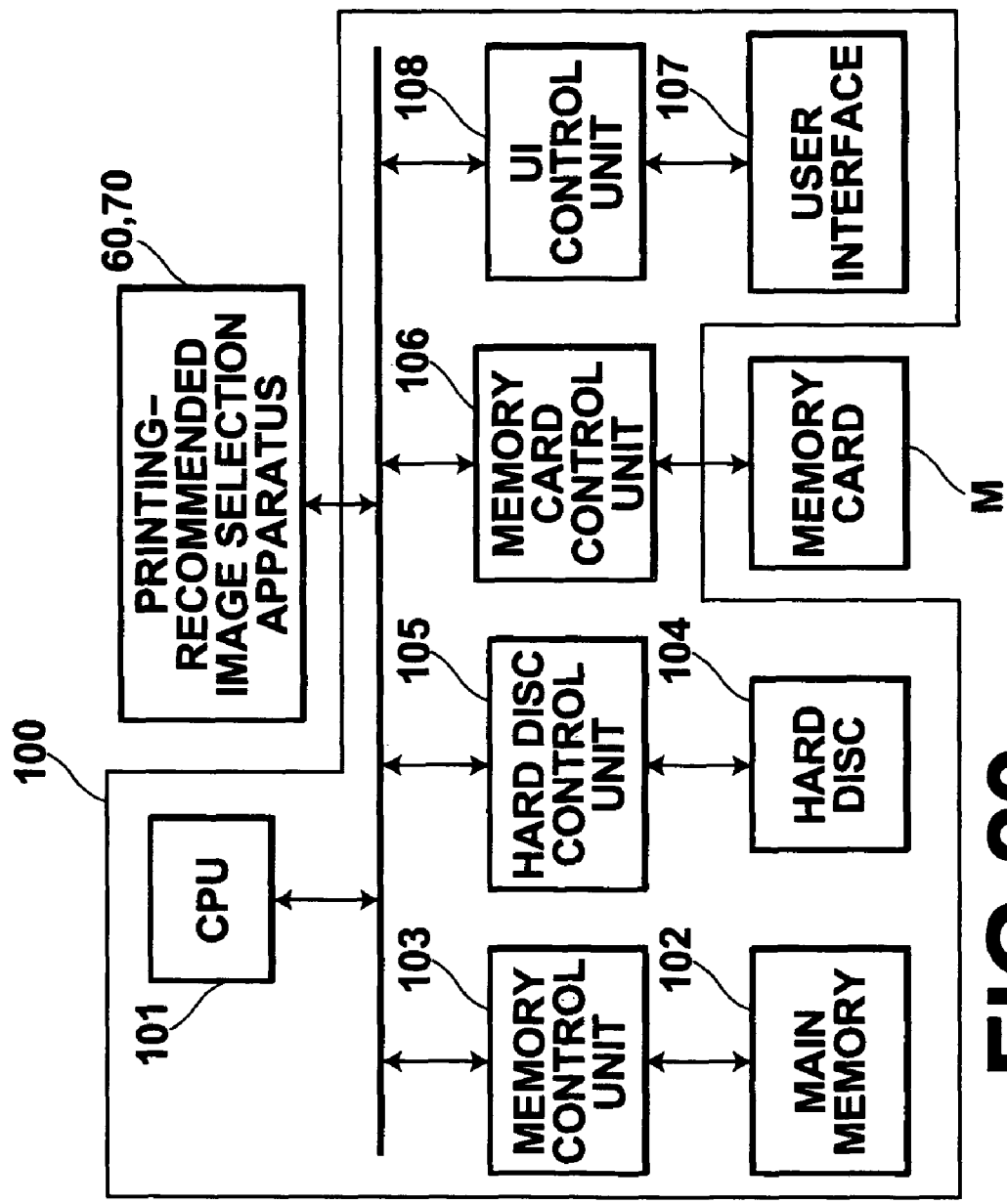
FIG. 29 is a block diagram showing the configuration of a seventh embodiment of the present invention as an example of application of the printing-recommended image selection apparatus of the present invention.

FIG. 29 is a block diagram showing the configuration of the seventh embodiment. A personal computer 100 has a CPU 101, a main memory 102, a memory control unit 103 for controlling the main memory 102, a hard disc 104, a hard disc control unit 105 for controlling the hard disc 104, a memory card control unit 106 for controlling a memory card M when the card M is inserted, a user interface 107 comprising display means and operation means, and a user interface control unit 108 for controlling the user interface 107. The printing-recommended image selection apparatus 60 or 70 is installed in the personal computer 100 or is accessible as an external apparatus.

Figure 30:
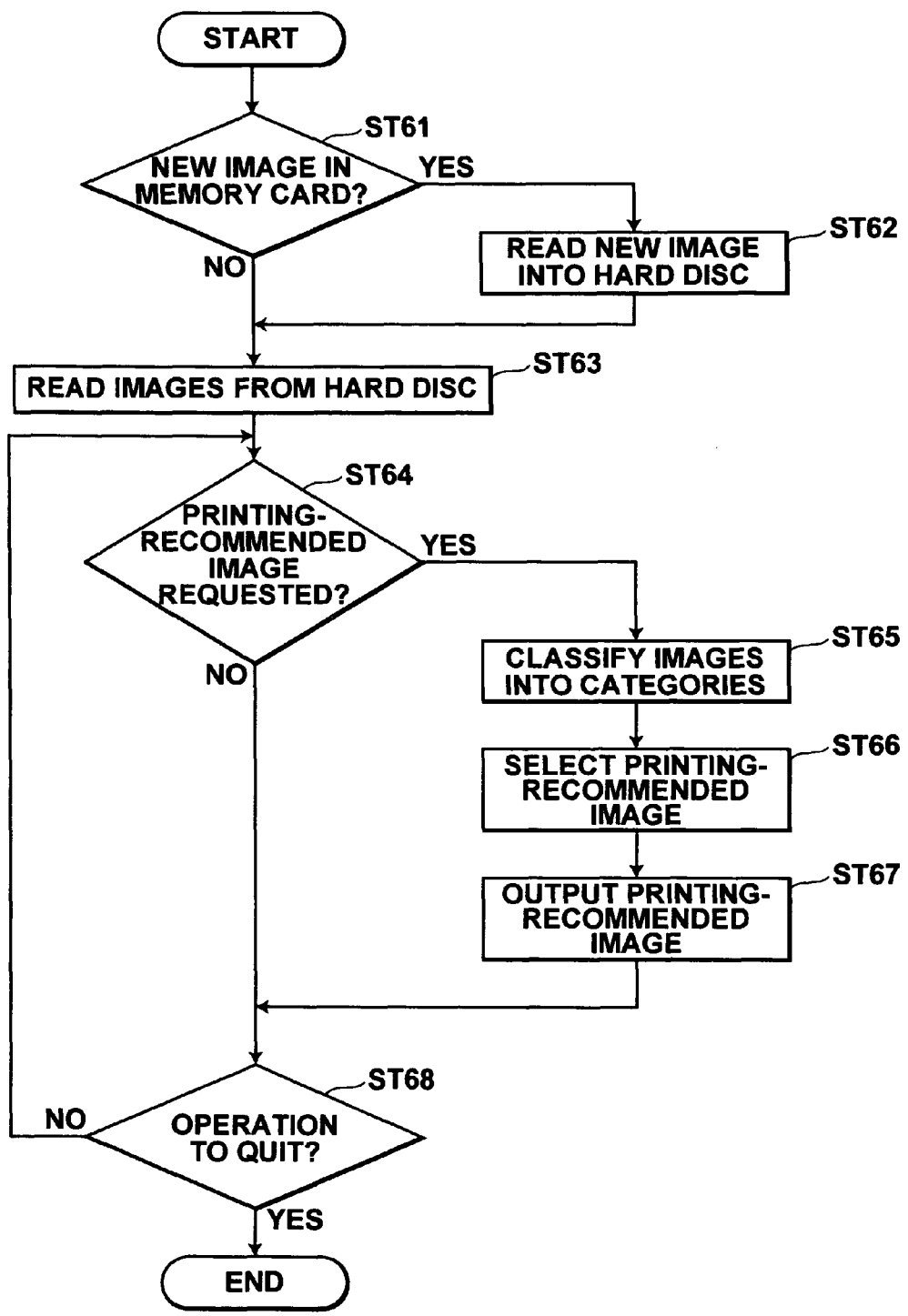
FIG. 30 is a flow chart showing a procedure carried out in the seventh embodiment.

Operation of the printing-recommended image selection apparatus in the seventh embodiment will be described below. FIG. 30 is a flow chart showing a procedure carried out in the seventh embodiment. In the description below, the personal computer 100 has the printing-recommended image selection apparatus 70 in the sixth embodiment.

When the memory card M is inserted in the personal computer 100, the memory card control unit 106 and the CPU 101 judge whether a new image is stored in the memory card M (Step ST61). If a new image is in the card, the new image is stored in the hard disc 104 (Step ST62). The hard disc 104 has a plurality of images including the new image.

The printing-recommended image selection apparatus 70 reads the images from the hard disc 104 (Step ST63), and judges whether or not the user has requested printing-recommended image display (Step ST64). If the result the result at ST64 is affirmative, the image classification unit 71 classifies the images into categories (Step ST65), and the image analysis unit 72, the suitability calculation unit 73, the parameter calculation unit 75 and the selection unit 74 select the printing-recommended image or images from the images read from the hard disc 104 (Step ST66). The selected printing-recommended image or images is/are output from the printing-recommended image selection apparatus 70 to the personal computer 100 so that the selected image or images is/are displayed on the display means of the personal computer 100 (Step ST67).

Whether the user has carried out an operation to quit is then judged (Step ST68). If the result the result of the judgment is affirmative, the printing-recommended image selection apparatus 70 ends the procedure.

An eighth embodiment of the present invention will be described next. In the eighth embodiment, the personal computer 100 has the printing-recommended image selection apparatus 60 or 70 as in the seventh embodiment. However, in the eighth embodiment, monitoring is always carried out on whether the memory card M has been inserted and whether the memory card M has a new image so that the CPU 101 can start the printing-recommended image selection apparatus 60 or 70 in the case where results of the judgment are affirmative. In the eighth embodiment, the CPU 101 is a part of the printing-recommended image selection apparatus 60 or 70, and comprises detection means and control means of the present invention.

Figure 31:
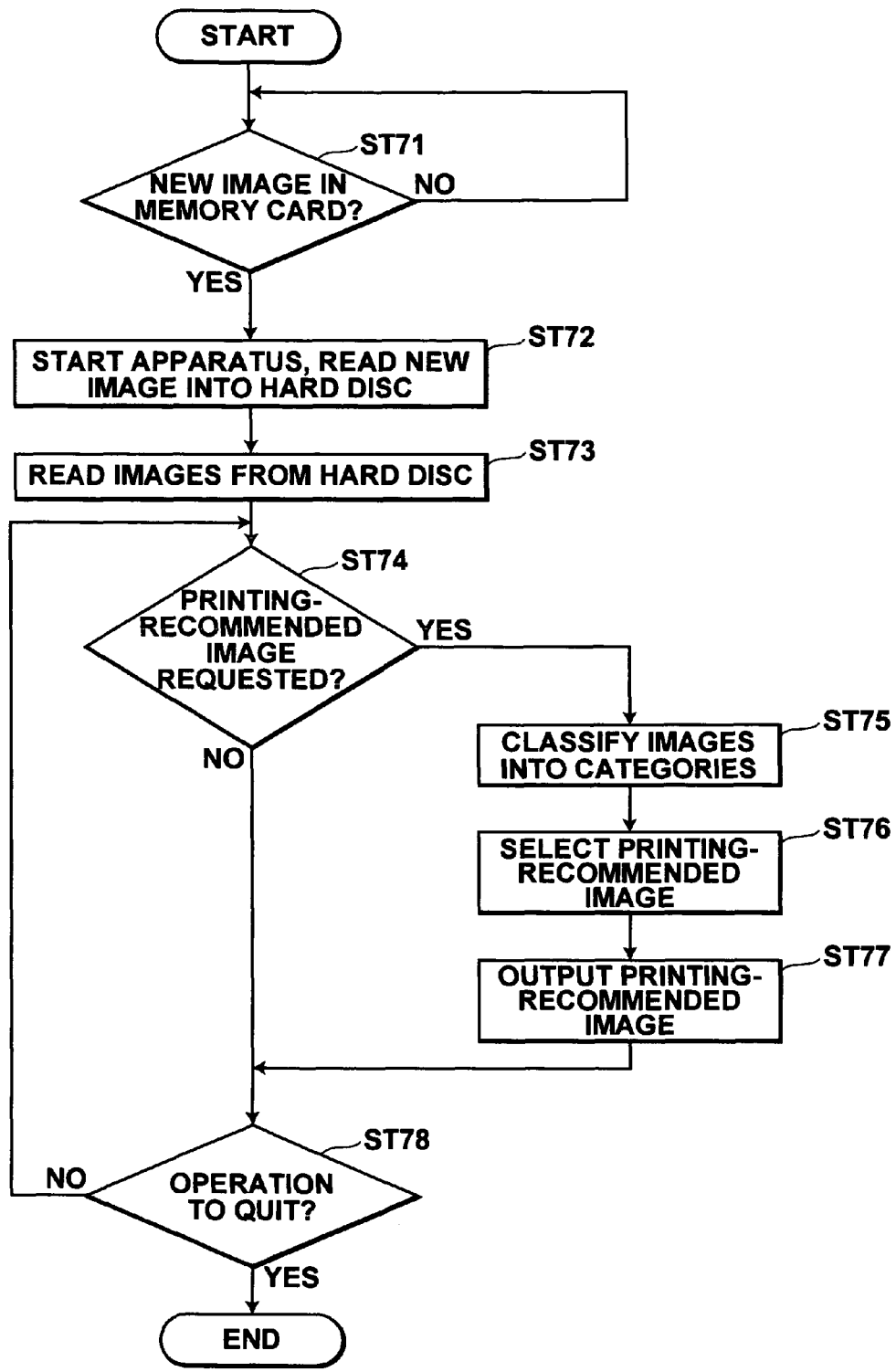
FIG. 31 is a flow chart showing a procedure carried out in an eighth embodiment of the present invention.

Hereinafter, operation of the printing-recommended image selection apparatus in the eighth embodiment will be described. FIG. 31 is a flow chart showing a procedure carried out in the eighth embodiment. In the description below, the personal computer 100 has the printing-recommended image selection apparatus 70.

The memory card control unit 106 and the CPU 101 monitor whether the memory card M is inserted in the personal computer 100 and whether the memory card M has a new image (Step ST71). If results of the judgment are affirmative, the printing-recommended image selection apparatus 70 is started to store the new image in the hard disc 104 (Step ST72).

The printing-recommended image selection apparatus 70 reads the images from the hard disc 104 (Step ST73), and judges whether or not the user has requested printing-recommended image display (Step ST74). If the result the result at ST74 is affirmative, the image classification unit 71 classifies the images into the categories (Step ST75), and the image analysis unit 72, the suitability calculation unit 73, the parameter calculation unit 75 and the selection unit 74 select the printing-recommended image or images from the images read from the hard disc 104 (Step ST76). The selected printing-recommended image or images is/are output from the printing-recommended image selection apparatus 70 to the personal computer 100 so that the selected image or images is/are displayed on the display means of the personal computer 100 (Step ST77).

Whether the user has carried out an operation to quit is then judged (Step ST78). If the result the result of the judgment is affirmative, the printing-recommended image selection apparatus 70 ends the procedure.

A ninth embodiment of the present invention will be described next. In the ninth embodiment, a digital camera has the printing-recommended image selection apparatus of the fifth or sixth embodiment of the present invention.

The digital camera has the printing-recommended image selection apparatus by installation of the printing-recommended image selection apparatus therein or through access to the printing-recommended image selection apparatus as an external apparatus.

Figure 32:
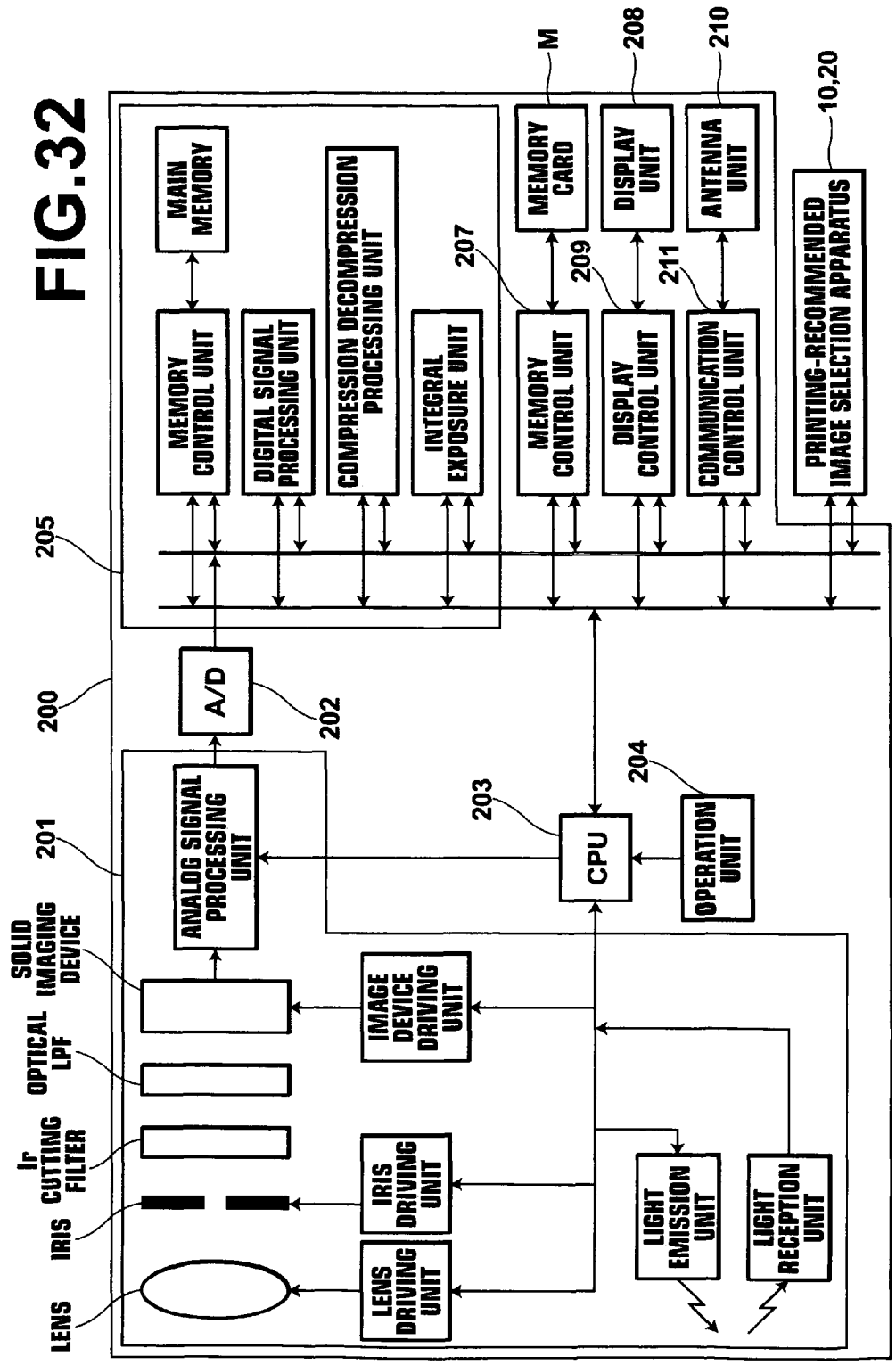
FIG. 32 is a block diagram showing the configuration of a ninth embodiment of the present invention as an example of application of the printing-recommended image selection apparatus of the present invention.

FIG. 32 is a block diagram showing the configuration of the ninth embodiment. A digital camera 200 has an imaging unit 201, an A/D converter 202, a CPU 203, an operation unit 204, an image processing unit 205, a memory card M attachable to and detachable from the digital camera, a memory control unit 207 for controlling the memory card M, a display unit 208, a display control unit 209 for controlling the display unit 208, an antenna unit 210, a communication control unit 211 for controlling the antenna 210. The printing-recommended image selection apparatus 60 or 70 in the fifth or sixth embodiment is installed in the digital camera 200 or accessible to the digital camera 200 as an external apparatus.

Figure 33:
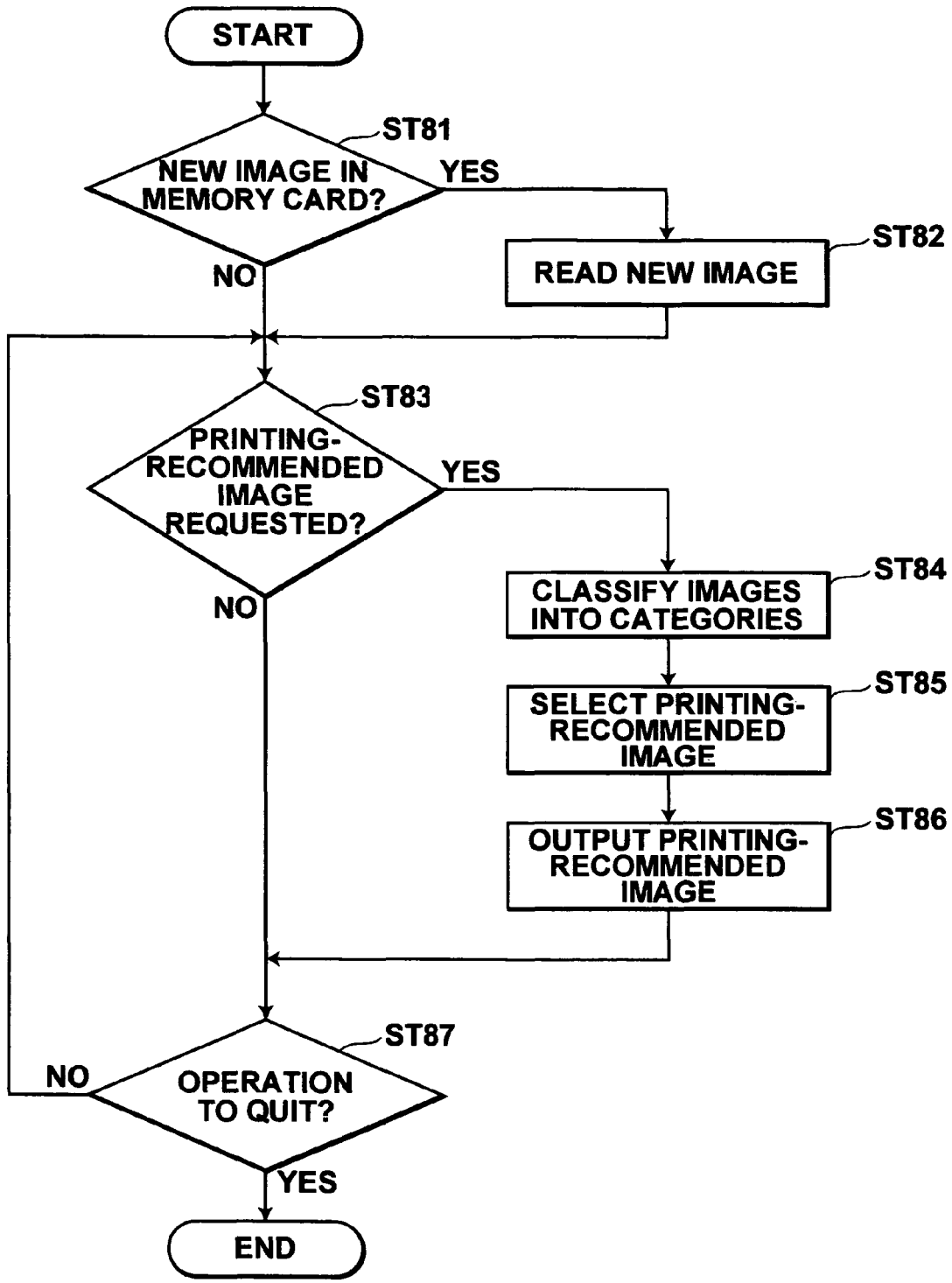
FIG. 33 is a flow chart showing a procedure carried out in the ninth embodiment.

Operation of the printing-recommended image selection apparatus in the ninth embodiment will be described below. FIG. 33 is a flow chart showing a procedure carried out in the ninth embodiment. In the description below, the digital camera 200 has the printing-recommended image selection apparatus 70 in the sixth embodiment.

The memory control unit 207 and the CPU 203 judge whether a new image is stored in the memory card M (Step ST81). If a new image is in the card, the printing-recommended image selection apparatus 70 reads the new image from the memory card M (Step ST82). Here, the memory card M has a plurality of images including the new image.

The printing-recommended image selection apparatus 70 judges whether or not the user has requested printing-recommended image display (Step ST83). If the result the result at ST83 is affirmative, the image classification unit 71 classifies the images into the categories (Step ST84), and the image analysis unit 72, the suitability calculation unit 73, the parameter calculation unit 75, and the selection unit 74 select the printing-recommended image or images from the images read from memory card M (Step ST85). The selected printing-recommended image or images is/are output from the printing-recommended image selection apparatus 70 to the digital camera 200 so that the selected image or images is/are displayed on the display unit 208 of the digital camera 200 (Step ST86).

Whether the user has carried out an operation to quit is then judged (Step ST87). If the result the result of the judgment is affirmative, the printing-recommended image selection apparatus 70 ends the procedure.

A tenth embodiment of the present invention will be described next. In the tenth embodiment, a printer has the printing-recommended image selection apparatus of the fifth or sixth embodiment of the present invention.

The printer has the printing-recommended image selection apparatus by installation of the printing-recommended image selection apparatus therein or through access to the printing-recommended image selection apparatus as an external apparatus.

Figure 34:
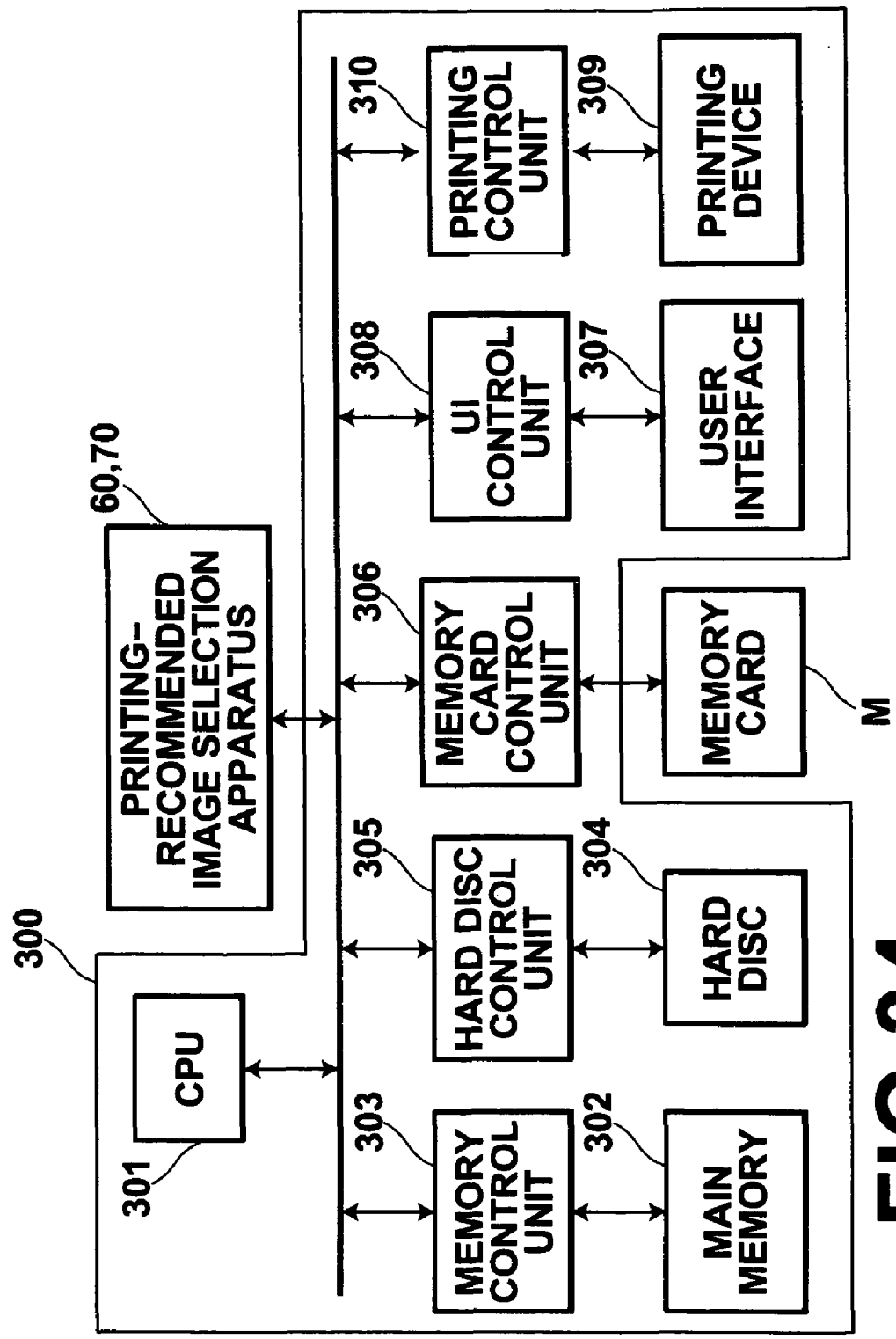
FIG. 34 is a block diagram showing the configuration of a tenth embodiment of the present invention as an example of application of the printing-recommended image selection apparatus of the present invention.

FIG. 34 is a block diagram showing the configuration of the tenth embodiment. A printer 300 has a CPU 301, a main memory 302, a memory control unit 303 for controlling the main memory 302, a hard disc 304, a hard disc control unit 305 for controlling the hard disc 304, a memory card control unit 306 for controlling a memory card M when the card M is inserted, a user interface 307 comprising display means and operation means, a user interface control unit 308 for controlling the user interface 307, a printing device 309, and a printing control unit 310 for controlling the printing device 309. The printing-recommended image selection unit 60 or 70 in the fifth or sixth embodiment is installed in the printer 300 or accessible to the printer 300 as an external apparatus.

Figure 35:
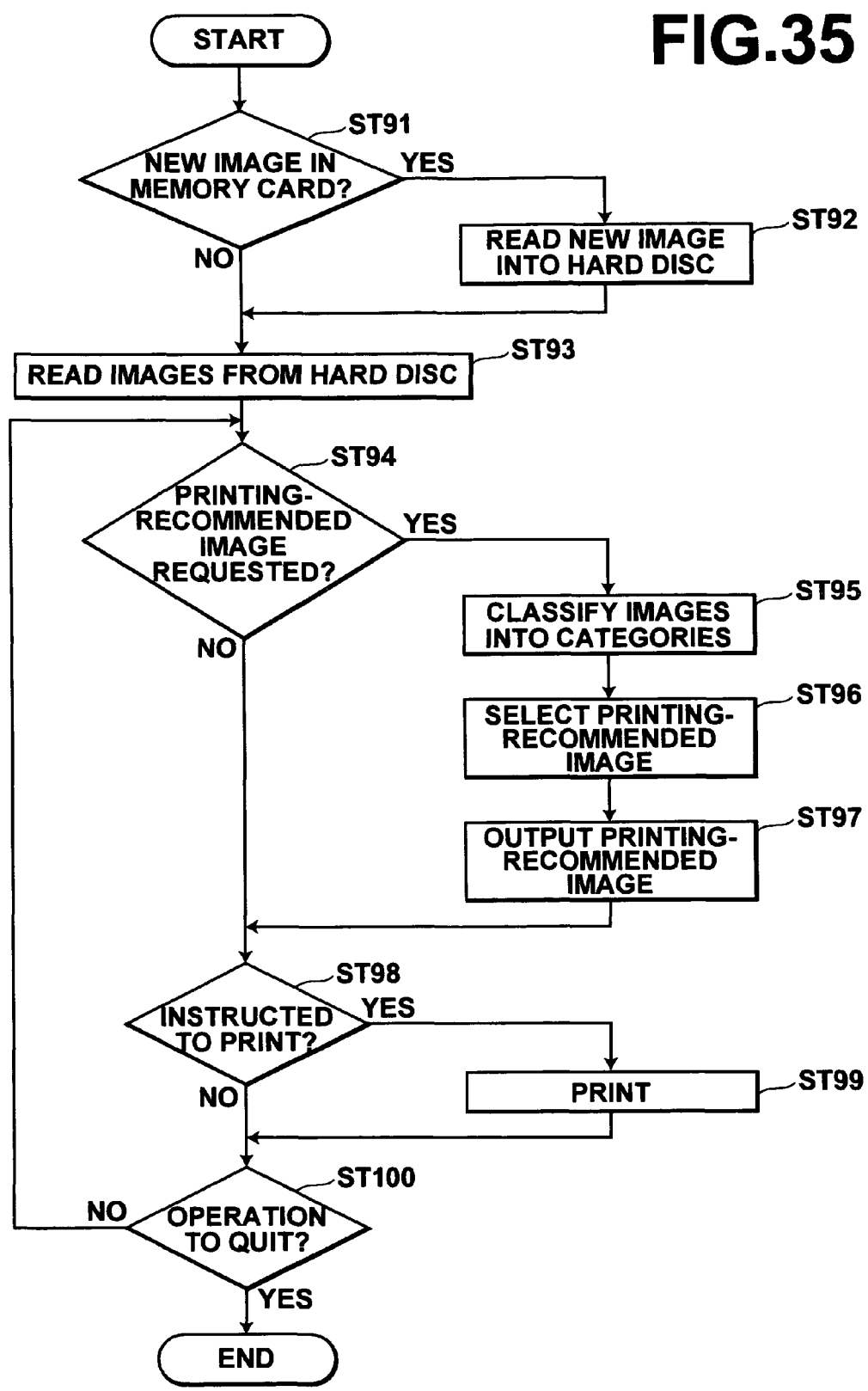
FIG. 35 is a flow chart showing a procedure carried out in the tenth embodiment.

Operation of the printing-recommended image selection apparatus in the tenth embodiment will be described below. FIG. 35 is a flow chart showing a procedure carried out in the tenth embodiment. In the description below, the printer 300 has the printing-recommended image selection apparatus 70 in the sixth embodiment.

When the memory card M is inserted in the printer 300, the memory card control unit 306 and the CPU 301 judge whether a new image is stored in the memory card M (Step ST91). If a new image is in the card, the new image is stored in the hard disc 304 (Step ST92). Here, the hard disc 304 has a plurality of images including the new image.

The printing-recommended image selection apparatus 70 reads the images from the hard disc 304 (Step ST93), and judges whether or not the user has requested-recommended image display (Step ST94). If the result the result at ST94 is affirmative; the image classification unit 71 classifies the images into the categories (Step ST95), and the image analysis unit 72, the suitability calculation unit 73, the parameter calculation unit 75, and the selection unit 74 select the printing-recommended image or images from the images read from the hard disc 304 (Step ST96). The selected printing-recommended image or images is/are output from the printing-recommended image selection apparatus 70 to the printer 300 so that the selected image or images is/are displayed on the display means of the printer 300 (Step ST97).

Whether the user has input an instruction to print is then judged (Step ST98). If the result the result of the judgment at ST98 is affirmative, the printing device 309 prints the printing-recommended image or images (Step ST99).

Whether the user has carried out an operation to quit is then judged (Step ST100). If the result the result of the judgment is affirmative, the printing-recommended image selection apparatus 70 ends the procedure.

An eleventh embodiment of the present invention will be described next. In the eleventh embodiment, a print order apparatus has the printing-recommended image selection apparatus of the fifth or sixth embodiment of the present invention.

The print order apparatus has the printing-recommended image selection apparatus by installation of the printing-recommended image selection apparatus therein or through access to the printing-recommended image selection apparatus as an external apparatus.

The print order apparatus refers to a photograph printing apparatus used in a DPE store or a mini-laboratory, or a self-printing apparatus installed in a store, for example. The user stores the images he/she photographed in a recording medium such as a memory card, and brings the medium to the store or the like. The user inserts the recording medium to the print order apparatus, and selects an image to print, by using the apparatus.

Figure 36:
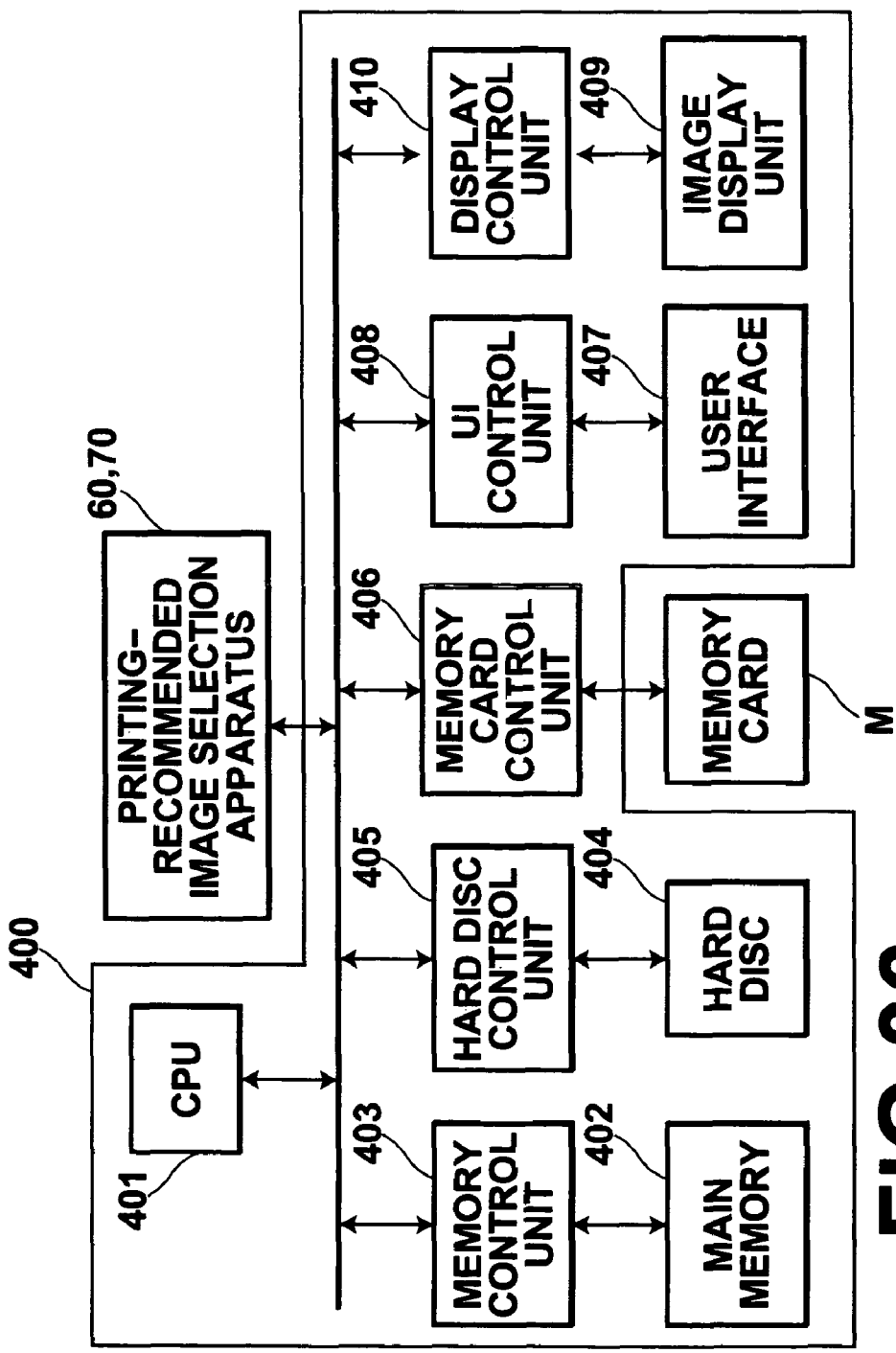
FIG. 36 is a block diagram showing the configuration of an eleventh embodiment of the present invention as an example of application of the printing-recommended image selection apparatus of the present invention.

FIG. 36 is a block diagram showing the configuration of the eleventh embodiment. A print order apparatus 400 has a CPU 401, a main memory 402, a memory control unit 403 for controlling the main memory 402, a hard disc 404, a hard disc control unit 405 for controlling the hard disc 404, a memory card control unit 406 for controlling a memory card M when the card M is inserted, a user interface 407 comprising display means and operation means, a user interface control unit 408 for controlling the user interface 407, an image display unit 409, and a display control unit 410 for controlling the image display unit 409. The printing-recommended image selection apparatus 60 or 70 in the fifth or sixth embodiment is installed in the print order apparatus 400 or accessible to the apparatus 400 as an external apparatus.

Figure 37:
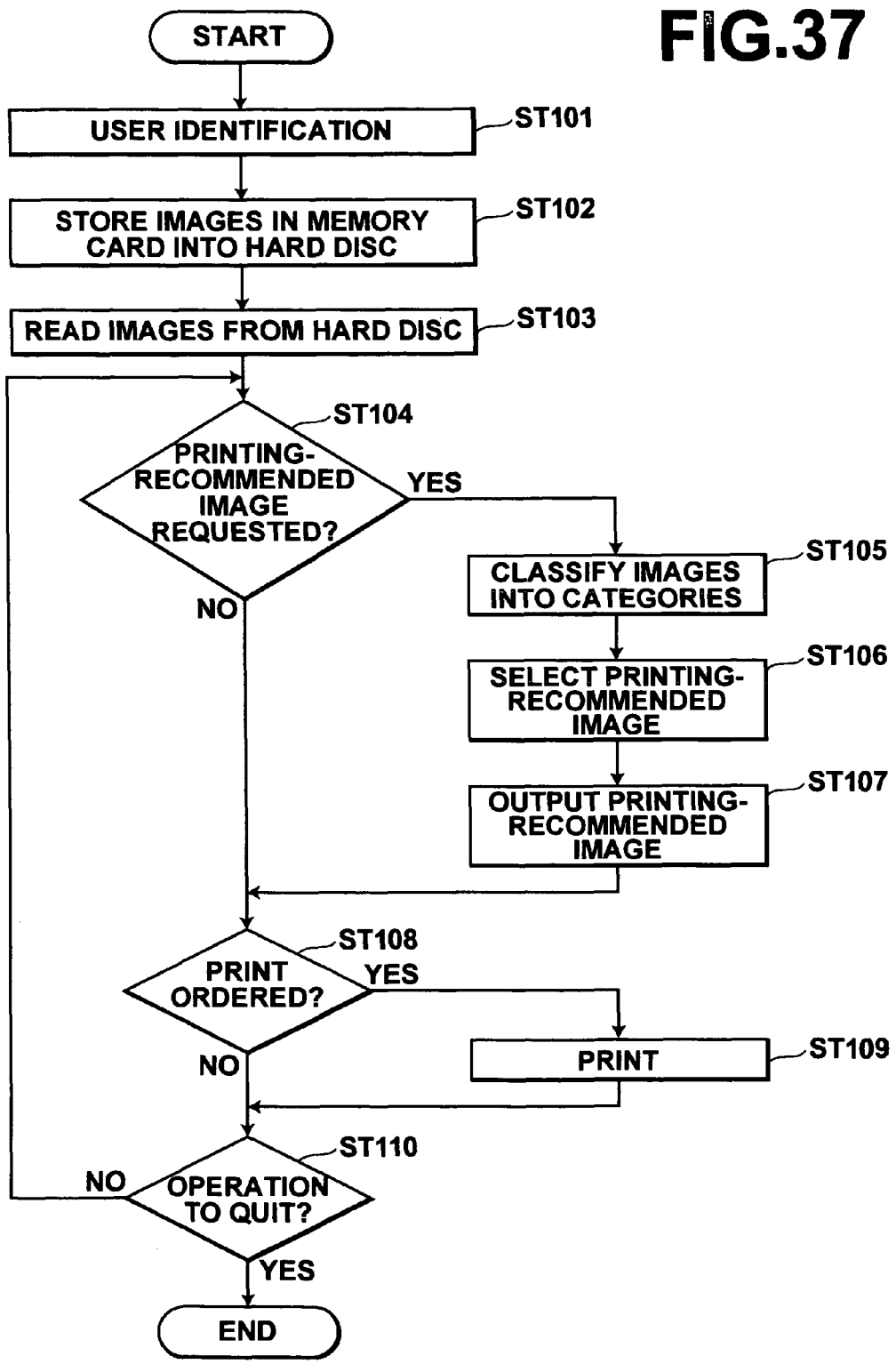
FIG. 37 is a flow chart showing a procedure carried out in the eleventh embodiment.

Operation of the printing-recommended image selection apparatus in the eleventh embodiment will be described below. FIG. 37 is a flow chart showing a procedure carried out in the eleventh embodiment. In the description below, the print order apparatus 400 has the printing-recommended image selection apparatus 70 in the sixth embodiment.

The user logs onto the print order apparatus 400 by using the operation means of the user interface 407, and inputs user information upon necessity. Use history of the user is identified in the printing-recommended image selection apparatus or the hard disc 404 of the print order apparatus 400 or the like, based on the information that has been input. The printing-recommended image selection apparatus 70 causes the use history of the user to be readable (user identification: Step ST101).

When the memory card M is inserted in the print order apparatus 400, the images stored in the memory card M are stored in the hard disc 404 (Step ST102). The printing-recommended image selection apparatus 70 reads the images from the hard disc 404 (Step ST103).

Whether or not the user has requested printing-recommended image display is then judged (Step ST104). If the result at ST104 is affirmative, the image classification unit 71 classifies the images into the categories (Step ST105), and the image analysis unit 72, the suitability calculation unit 73, the parameter calculation unit 75, and the selection unit 74 select the printing-recommended image or images from the images read from the hard disc 404 (Step ST106). The selected printing-recommended image or images is/are output from the printing-recommended image selection apparatus 70 to the print order apparatus 400 so that the selected image or images is/are displayed on the display unit 409 of the print order apparatus 400 (Step ST107).

Whether the user has input an instruction to print is then judged (Step ST108). If the result of the judgment at ST108 is affirmative, the printing-recommended image or images is/are output from the print order apparatus 400 to a printer or the like where printing is carried out (Step ST109).

Whether the user has carried out an operation to quit is then judged (Step ST110). If the result of the judgment is affirmative, the printing-recommended image selection apparatus 70 ends the procedure.

By applying the printing-recommended image selection apparatus of the fifth or sixth embodiment to the personal computer, the digital camera, the printer, the print order apparatus, or the like, a user can select the image or images to print according to his/her preference, in the same manner as the user actually selects the image or images to print.

The functions of the printing-recommended image selection apparatus in the fifth or sixth embodiment may be installed in the form of programs in the personal computer, the digital camera, the printer, or the print order apparatus or the like. A cellular phone enabling attachment and detachment of a recording medium such as a memory card or a mobile storage having a display screen may also has the printing recommended image selection apparatus applied thereto.

What is claimed is:

1. A printing-recommended image selection apparatus for selecting a printing-recommended image whose printing is recommended from a plurality of images, the apparatus comprising applying a processor to perform:

classification means for carrying out classification of the images into categories; analysis means for carrying out analysis of the images; suitability calculation means for carrying out calculation of printing suitability, based on a result of the classification by the classification means and a result of the analysis by the analysis means;

selection means for carrying out selection of the printing-recommended image from the images, according to the printing suitability, and importance degree setting means for calculating a degree of importance for each of the categories through weighted addition of a number of images in the category, a number of categories related to the category, and a number of hierarchical levels below the category according to:

weight=$a1 \times$(the number of images in the category)+ $b1 \times$(the number of categories related to the category)+$c1 \times$(the number of levels below the category), where $a1$, $b1$, and $c1$ are weighting coefficients.

2. The printing-recommended image selection apparatus according to claim 1 further comprising parameter calculation means for calculating a parameter representing preference of a user, wherein the selection means selects the printing-recommended image based on the parameter and the printing suitability.

3. The printing-recommended image selection apparatus according to claim 1, further comprising:

detection means for detecting input of the images; and control means for controlling the classification means, the analysis means, the suitability calculation means, and the selection means to respectively carry out the classification, the analysis, the calculation of the printing suitability, and the selection when the detection means detects the input of the images.

4. A digital camera comprising the printing-recommended image selection apparatus of claim 1.

5. A printer comprising the printing-recommended image selection apparatus of claim 1.

6. A print order apparatus comprising the printing-recommended image selection apparatus of claim 1.

7. A printing-recommended image selection method for selecting a printing-recommended image whose printing is recommended from a plurality of images, the method comprising applying a processor to perform:

carrying out classification of the images into categories;

carrying out analysis of the images;

carrying out calculation of printing suitability, based on a result of the classification and a result of the analysis;

carrying out selection of the printing-recommended image from the images, according to the printing suitability; and calculating a degree of importance for each of the categories through weighted addition of a number of images in the category, a number of categories related to the category, and a number of hierarchical levels below the category according to:

$$\text{weight} = a1 \times (\text{the number of images in the category}) + b1 \times (\text{the number of categories related to the category}) + c1 \times (\text{the number of levels below the category}),$$

where a1, b1, and c1 are weighting coefficients.

8. A non-transitory computer-readable storage medium encoded with a computer program for causing a computer to execute a printing-recommended image selection method for selecting a printing-recommended image whose printing is recommended from a plurality of images, the program comprising:

carrying out classification of the images into categories;

carrying out analysis of the images;

carrying out calculation of printing suitability, based on a result of the classification and a result of the analysis;

carrying out selection of the printing-recommended image from the images, according to the printing suitability; and calculating a degree of importance for each of the categories through weighted addition of a number of images in the category, a number of categories related to the category, and a number of hierarchical levels below the category according to: weight=a1×(the number of images in the category)+b1×(the number of categories related to the category)+c1×(the number of levels below the category), where a1, b1, and c1 are weighting coefficients.

* * * * *